US011817783B2

(12) United States Patent
Sigamani et al.

(10) Patent No.: US 11,817,783 B2
(45) Date of Patent: *Nov. 14, 2023

(54) CONTROLLING REVERSE CURRENT IN SWITCHED MODE POWER SUPPLIES TO ACHIEVE ZERO VOLTAGE SWITCHING

(71) Applicant: Astec International Limited, Kowloon (HK)

(72) Inventors: James Sigamani, Pasig (PH); Jonathan Ross B. Fauni, Quezon (PH)

(73) Assignee: Astec International Limited, Kowloon (HK)

( * ) Notice: Subject to any disclaimer, the term of this patent is extended or adjusted under 35 U.S.C. 154(b) by 0 days.

This patent is subject to a terminal disclaimer.

(21) Appl. No.: 17/592,806

(22) Filed: Feb. 4, 2022

(65) Prior Publication Data

US 2022/0158557 A1 May 19, 2022

Related U.S. Application Data

(63) Continuation of application No. 16/916,613, filed on Jun. 30, 2020, now Pat. No. 11,251,705.

(51) Int. Cl.
*H02M 3/158* (2006.01)
*H02M 1/00* (2006.01)
*H02M 3/335* (2006.01)

(52) U.S. Cl.
CPC ......... *H02M 3/158* (2013.01); *H02M 1/0058* (2021.05); *H02M 1/007* (2021.05);
(Continued)

(58) Field of Classification Search
CPC .. H02M 1/0043; H02M 1/0058; H02M 1/007; H02M 1/0074; H02M 1/0077;
(Continued)

(56) References Cited

U.S. PATENT DOCUMENTS 9,729,054 B2  8/2017 Ernest et al.
10,079,541 B1  9/2018 Taban
(Continued)

FOREIGN PATENT DOCUMENTS

CN   109586574 A   4/2019
JP   2018074692 A   5/2018
TW   201622332 A   6/2016

OTHER PUBLICATIONS

Japan Office Action for JP Application No. 2021-107182, dated Aug. 2, 2022; 4 pages.
(Continued)

*Primary Examiner* — Fred E Finch, III

(57) ABSTRACT

A switched mode power supply includes a multilevel buck power converter and a control circuit. The power converter includes a first buck circuit and a second buck circuit each having a power switch, a rectifier, and an inductor. The power supply may further include a resonant power converter coupled to the multilevel buck power converter. In some examples, the control circuit is configured to generate control signals for the first buck circuit's power switch and the second buck circuit's power switch to control the power converter, and adjust a switching frequency of the control signals to control the amount of reverse current flowing in the first buck circuit and the second buck circuit to achieve zero voltage switching of the first buck circuit's power switch and the second buck circuit's power switch. Other example multilevel buck power converters and power supplies are also disclosed.

19 Claims, 14 Drawing Sheets

(52) U.S. Cl.
CPC ........ *H02M 1/0043* (2021.05); *H02M 1/0083* (2021.05); *H02M 3/33569* (2013.01)

(58) Field of Classification Search
CPC ......... H02M 1/0083; H02M 3/01–015; H02M 3/156–1588; H02M 3/33569; H02M 3/33576

See application file for complete search history.

(56) References Cited

U.S. PATENT DOCUMENTS

| | | | |
|---|---|---|---|
| 10,224,802 | B1 | 3/2019 | Chakkirala |
| 10,651,739 | B1 | 5/2020 | Li et al. |
| 10,985,659 | B2 | 4/2021 | Mihai et al. |
| 11,251,705 | B2* | 2/2022 | Sigamani ............. H02M 1/0058 |
| 2008/0239772 | A1 | 10/2008 | Oraw et al. |
| 2014/0112025 | A1 | 4/2014 | Mueller et al. |
| 2014/0312868 | A1* | 10/2014 | Dally .................. H02M 3/1588 323/282 |
| 2015/0357912 | A1 | 12/2015 | Perreault et al. |
| 2016/0329811 | A1 | 11/2016 | Du et al. |
| 2018/0013346 | A1 | 1/2018 | Westmoreland |
| 2018/0212525 | A1* | 7/2018 | Beltran ............. H02M 3/33573 |
| 2019/0245432 | A1 | 8/2019 | Yan et al. |
| 2020/0083805 | A1 | 3/2020 | Mauri |
| 2020/0083818 | A1 | 3/2020 | Lin et al. |
| 2020/0228022 | A1 | 7/2020 | Hu et al. |
| 2020/0313570 | A1* | 10/2020 | Hall .......................... G06F 1/26 |
| 2021/0091677 | A1 | 3/2021 | Ye et al. |

OTHER PUBLICATIONS

Taiwan Office Action for Taiwan Application No. 110122891, dated Apr. 15, 2022; 11 pages.
Extended European Search Report for EP Application 21182492.5, dated Nov. 25, 2021; 7 pages.
European Examination Report for EP Application No. 21182492.5, dated Dec. 21, 2022; 7 pages.
Jong-Bok Baek et al: "Digital Adaptive Frequency Modulation for Bidirectional DC DC Converter", IEEE Transactions on Industrial Electronics, vol. 60, No. 11, Nov. 1, 2013, pp. 5167-5176.

* cited by examiner

US 11,817,783 B2

CONTROLLING REVERSE CURRENT IN SWITCHED MODE POWER SUPPLIES TO ACHIEVE ZERO VOLTAGE SWITCHING

CROSS-REFERENCE TO RELATED APPLICATIONS

This application claims the benefit of and priority to U.S. application Ser. No. 16/916,613 filed Jun. 30, 2020, and issued as U.S. Pat. No. 11,251,705 on Feb. 15, 2022, the entire disclosure of which is incorporated herein by reference.

TECHNICAL FIELD

The present disclosure relates to controlling reverse current in switched mode power supplies to achieve zero voltage switching.

BACKGROUND

This section provides background information related to the present disclosure which is not necessarily prior art.

Electric power supplies commonly include one or more power converter stages for converting an input current and voltage to an output current and voltage. The power converter stages may include, for example, a resonant power converter such as a multilevel LLC power converter or an interleaved resonant bus power converter. Switches in the power converter stages may be controlled with fixed or varying switching frequencies or duty cycles, and achieve zero voltage switching (ZVS).

SUMMARY

This section provides a general summary of the disclosure, and is not a comprehensive disclosure of its full scope or all of its features.

According to one aspect of the present disclosure, a switched mode power supply (SMPS) includes a multilevel buck power converter, a resonant power converter, and a control circuit. The multilevel buck power converter includes an input, an output, and a first buck circuit and a second buck circuit each coupled between the input and the output. The first buck circuit includes a power switch, a rectifier, and an inductor, and the second buck circuit includes a power switch, a rectifier, and an inductor. The resonant power converter is coupled to the output of the multilevel buck power converter. The control circuit is coupled to the first buck circuit and the second buck circuit. The control circuit is configured to generate a first control signal for the power switch of the first buck circuit and a second control signal for the power switch of the second buck circuit to control the multilevel buck power converter.

According to another aspect of the present disclosure, a SMPS includes a multilevel buck power converter and a control circuit. The multilevel buck power converter includes a first buck circuit and a second buck circuit. The first buck circuit includes a power switch, a rectifier, and an inductor, and the second buck circuit includes a power switch, a rectifier, and an inductor. The control circuit is coupled to the first buck circuit and the second buck circuit. The control circuit is configured to generate a first control signal for the power switch of the first buck circuit and a second control signal for the power switch of the second buck circuit to control the multilevel buck power converter in a continuous conduction mode so that reverse current flows in the first buck circuit and the second buck circuit, and adjust a switching frequency of the first control signal and the second control signal to control the amount of reverse current flowing in the first buck circuit and the second buck circuit to achieve ZVS of the power switch of the first buck circuit and the power switch of the second buck circuit while the multilevel buck power converter is in its continuous conduction mode.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

BRIEF DESCRIPTION OF THE DRAWINGS

The drawings described herein are for illustrative purposes only of selected embodiments and not all possible implementations and are not intended to limit the scope of the present disclosure.

Corresponding reference numerals indicate corresponding (but not necessarily identical) parts and/or features throughout the several views of the drawings.

DETAILED DESCRIPTION

Figure 1:
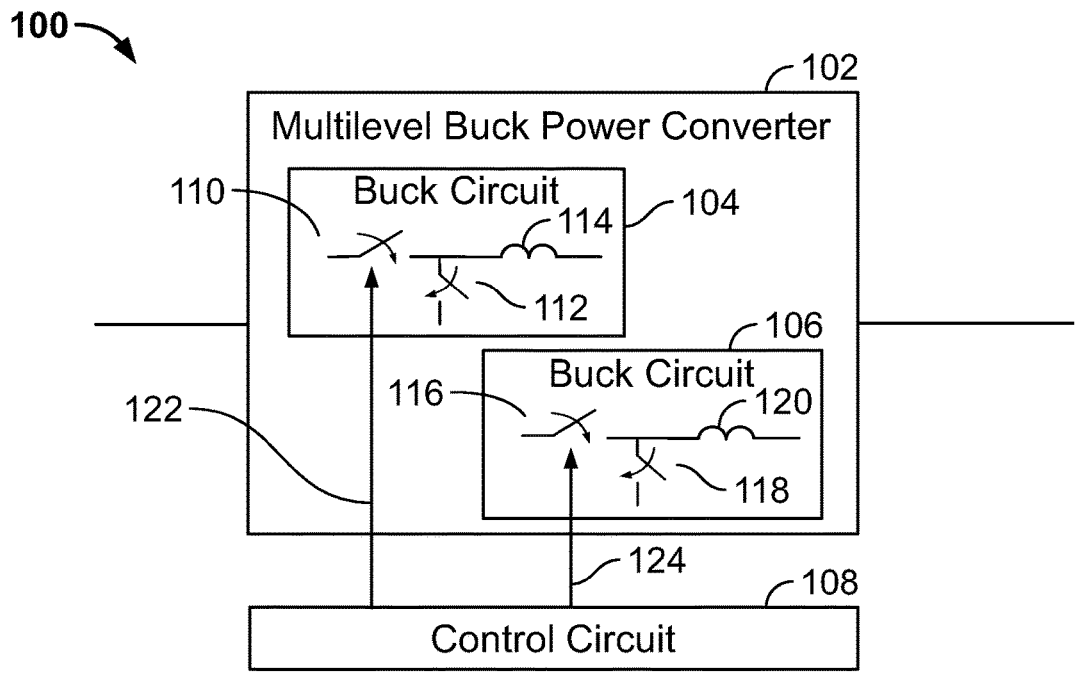
FIG. 1 is a block diagram of a SMPS including a multilevel buck power converter and a control circuit for adjusting a switching frequency of switches in the power converter to achieve ZVS according to one example embodiment of the present disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Example embodiments will now be described more fully with reference to the accompanying drawings.

A switched mode power supply for powering a load according to one example embodiment of the present disclosure is illustrated in FIG. 1 and indicated generally by reference number 100. As shown in FIG. 1, the switched mode power supply 100 includes a multilevel DC-DC buck power converter 102 having buck circuits 104, 106, and a control circuit 108 coupled to the buck circuits 104, 106. The buck circuit 104 includes a power switch 110, a rectifier switch 112, and an inductor 114, and the buck section 106 having a power switch 116, a rectifier switch 118, and an inductor 120. The control circuit 108 is configured to generate control signals 122, 124 for the power switches 110, 116 to control the multilevel DC-DC buck power converter 102 in a continuous conduction mode (CCM) so that reverse current flows in the buck circuits 104, 106, and adjust a switching frequency of the control signals 122, 124 to control the amount of reverse current to achieve ZVS of the power switches 110, 116 while the buck power converter 102 is in its continuous conduction mode.

By adjusting the switching frequency of the control signals 122, 124 and controlling the amount of reverse current flowing through the buck circuits 104, 106, the dynamic performance and efficiency of the power supply 100 is improved throughout various load conditions as compared to convention power supplies. For example, reverse current may flow in each buck circuit 104, 106 during its freewheeling period. Specifically, when a load current drops below fifty percent (50%) of a peak-to-peak ripple current of the inductors 114, 120, the current through the inductors 114, 120 will become negative (e.g., the ripple current—the load current). This causes reverse current to flow from the load through the inductors 114, 120 and the rectifier switches 112, 118 (e.g., field-effect transistors such as MOSFETSs, etc.). For example, during the freewheeling period of the buck circuit 104, reverse current may flow from the power converter's output through the inductor 114 and the rectifier switch 112 (e.g., a synchronous rectifier switch, etc.) when the load current drops below fifty percent of the peak-to-peak ripple current of the inductor 114. When the switching frequency is fixed, the amount of reverse current flowing in the buck circuits 104, 106 (e.g., through the rectifier switches 112, 118) will increase as the load decreases. The increased reverse current may cause the root mean square (RMS) current flowing through the inductors 114, 120 to increase to an undesirable level, and as a result increase losses.

However, if the switching frequency is changed (e.g., as load conditions change, etc.), the amount of reverse current flowing through the buck circuits 104, 106 may be controlled at a desirable level. For example, and as further explained below, the reverse current may be controlled to ensure ZVS of the power switches 110, 116 is achieved. In such examples, the reverse current flows through the rectifier switches 112, 118 and discharges a voltage across the power switches 110, 116 to zero before the power switches 110, 116 turn on. The desired amount of reverse current to achieve ZVS depends on, for example, the load, the inductors 114, 120, etc. In some examples, ZVS may be achieved without tuning (and/or retuning) the inductors 114, 120 when the load coupled to the power supply 100 changes. As such, the efficiency of the power converter 102 may be optimized during different load conditions (e.g., during light load conditions) without tuning (and/or retuning) the inductors 114, 120.

As explained above, the multilevel DC-DC buck power converter 102 is controlled in a CCM. As such, current continuously flows through the inductors 114, 120. The CCM operation of the power converter 102 may be maintained across the entire load range, including down to a zero load condition. In such examples, the control bandwidth during light load conditions may be increased as compared to other power converters controlled in a discontinuous conduction mode (DCM). As a result, the response time of the control circuit 108 may be increased as compared to other power converters.

In some examples, it may be desired to change, limit, etc. the amount of reverse current flowing in the buck circuits 104, 106. For example, a defined amount of reverse current may be required to achieve ZVS of the power switches 110, 116. However, excessive amounts of reverse current may be detrimental (e.g., reduced efficiency, etc.) to the buck circuits 104, 106. Therefore, the control circuit 108 may adjust the switching frequency to obtain a desired amount of reverse current. In some examples, the control circuit 108 may decrease or increase the switching frequency of one or both control signals 122, 124 to increase, decrease, or maintain the reverse current in the buck circuits 104, 106. For example, decreasing the switching frequency may cause an increase in the inductor's ripple current (as further explained below). As a result of the increased ripple current, the reverse current may increase.

The switching frequency of the control signals 122, 124 may be adjusted based on various parameters. For example, the switching frequency may be adjusted based on the amount of reverse current flowing through the buck circuits 104, 106. In such examples, the control circuit 108 may monitor (e.g. sense with a current sensor, etc.) the reverse current flowing through the buck circuits 104, 106, and adjust the switching frequency of the control signal 122 based on a value of the reverse current through the buck circuit 104 and/or the switching frequency of the control signal 124 based on a value of the reverse current flowing through the buck circuit 106.

In some examples, the switching frequency of one or both control signals 122, 124 may be adjusted in steps based on the value of the reverse current. In such examples, the switching frequency may change in steps when the load changes. For example, different switching frequencies may correspond to different load bands. For instance, a switching frequency F1 may correspond to a load band of 0 to 10%, a switching frequency F2 may correspond to a load band of 10% to 20%, a switching frequency F3 may correspond to a load band of 20% to 30%, and a switching frequency F4 may correspond to a load band of 30% to 40%. In some examples, the switching frequency F1 may have the largest value as compared to the other frequency values, the switching frequency F4 may have the lowest value as compared to the other frequency values, and the switching frequency F2 may be greater than the switching frequency F3. In such examples, the reverse current flowing through the buck circuit 104 and/or the buck circuit 106 is allowed to increase (e.g., due to an increase in the load) up to a certain amount (e.g., 2.5 A, etc.) before the control circuit 108 changes the frequency (e.g., from F1 to F2). Once the frequency is changed, the amount of reverse current may decrease to a lower level.

In other examples, the switching frequency may be adjusted based on the load. For example, the power supply 100 of FIG. 1 provides a load current for powering a load (not shown) connected to the power supply 100. In such examples, the control circuit 108 may adjust the switching frequency of one or both control signals 122, 124 when the load current is in a defined range. When operated in this mode, the power switches 110, 116 may achieve ZVS throughout the defined range without excessive reverse current due to the changing switching frequency. As a result of the limited reverse current, net efficiency may be maintained and/or increased throughout the defined load range. The control circuit 108 may adjust the switching frequency as necessary to obtain the desired amount of reverse current to achieve ZVS. For example, the switching frequency may be at one value when the load current is near a lower boundary of the defined range, and the switching frequency may be at a lower value when the load current is near an upper boundary of the defined range.

The defined range may be depend on, for example, the full load peak current of the power supply 100. In such examples, the defined range may include 0 to 40% of the full load peak current, 10% to 40% of the full load peak current, 15% to 35% of the full load peak current, 5% to 45% of the full load peak current, and/or another suitable range. In other examples, the defined range may be based on another parameter if desired.

In some preferred embodiments, the control circuit 108 adjusts the switching frequency of one or both control signals 122, 124 only when the load current is in the defined range. When the load current is outside the defined range, the control signals 122, 124 may have a fixed switching frequency. For example, when the load current of the power supply 100 is above the defined range (e.g., greater than 30%, 35%, 40%, 45%, etc.), the control signals 122, 124 may have a fixed switching frequency. During this time, the power converter 102 may be in a heavy load operation and controlled in a CCM (e.g., a CCM fixed frequency mode). In some examples, there may be little to no reverse current in the power converter 102, particularly as the load increases.

When the load current of the power supply 100 is below the defined range (e.g., less than 5%, 10%, 15%, 20%, etc.), the control signals 122, 124 may have another (different) fixed switching frequency. During this time, the power converter 102 may be in a light load operation and controlled in its CCM (e.g., a CCM fixed frequency mode). In such examples, the reverse current flowing through the buck circuits 104, 106 is allowed to exceed a level required for ZVS.

The fixed switching frequency of when the load current is less than the defined range may be the same or different than the fixed switching frequency of when the load current is greater than the define range. For example, the fixed switching frequency when the load current is below the defined range may be greater than the fixed switching frequency when the load current is above the defined range. This decreased frequency may reduce the inductor ripple current and the reverse current in the buck circuits 104, 106.

As shown in FIG. 1, the multilevel DC-DC buck power converter 102 (and/or any other multilevel buck power converter disclosed herein) includes only two buck circuits 104, 106 (e.g., power conversion levels). In other embodiments, the multilevel DC-DC buck power converter 102 (and/or any one of the other multilevel buck power converters disclosed herein) may include more than two buck circuits (e.g., power conversion levels).

Figure 2:
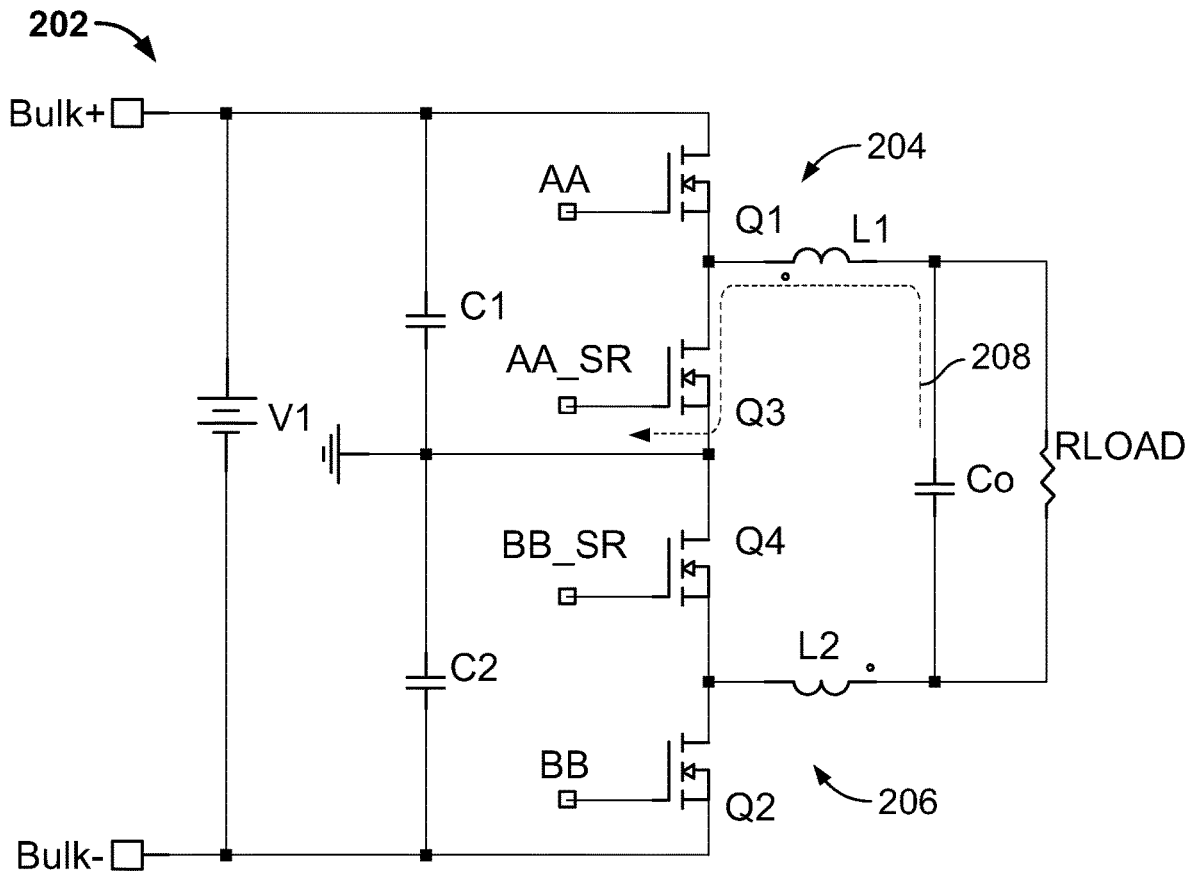
FIG. 2 is a circuit schematic of a multilevel buck power converter employable in the SMPS of FIG. 1, according to another example embodiment.

FIG. 2 illustrates one example of a multilevel buck power converter that may be used in the power supply 100 of FIG. 1. Specifically, FIG. 2 illustrates a multilevel DC-DC buck power converter 202 including buck circuits 204, 206. The buck circuit 204 includes a power switch Q1, a synchronous rectifier switch Q3, and an inductor L1 coupled between the power switch Q1 and the synchronous rectifier switch Q3 to form a buck converter topology. The buck circuit 206 includes a power switch Q2, a synchronous rectifier switch Q4, and an inductor L2 coupled between the power switch Q2 and the synchronous rectifier switch Q4 to form a buck converter topology. Although the switches Q1-Q4 are shown as MOSFETs in FIG. 2, any other suitable switching device may be employed if desired.

As shown in FIG. 2, the buck circuit 204 is coupled between a positive bulk input voltage and a reference voltage (e.g., ground), and the buck circuit 206 is coupled between a negative bulk input voltage and the reference voltage. Specifically, the power switch Q1 is coupled to the positive bulk input voltage (e.g., the positive side of an input source V1), the power switch Q2 is coupled to the negative bulk input voltage (e.g., the negative side of the input source V1), and the synchronous rectifier switches Q3, Q4 are coupled to a reference voltage (e.g., ground). As shown in FIG. 2, the power converter 202 includes an output capacitor Co coupled between the inductors L1, L2.

In the example embodiment of FIG. 2, the power converter 202 includes input side capacitors coupled across the buck circuits 204, 206. Specifically, the power converter 202 includes a capacitor C1 coupled between the positive bulk input voltage and the reference voltage, and a capacitor C2 coupled between the negative bulk input voltage and the reference voltage. The capacitor C1 is coupled between the converter's input and the buck circuit 204 (e.g., the switches Q1, Q3), and the capacitor C2 is coupled between the converter's input and the buck circuit 206 (e.g., the switches Q2, Q4). This arrangement ensures the voltage across the capacitors C1, C2 (and therefore across the switches Q1-Q4) is maintained at half the input voltage provided by the input source V1. For example, the input source V1 may provide a high input DC voltage such as 800 V to the power converter 202. In this example, the voltage across each capacitor C1, C2 is maintained at 400V. As such, the maximum voltage stress (Vds) applied across the switches Q1-Q4 is about 400 V. In some examples, a Vienna AC-DC rectifier be employed to provide the voltage across the capacitors C1, C2.

Figure 3:
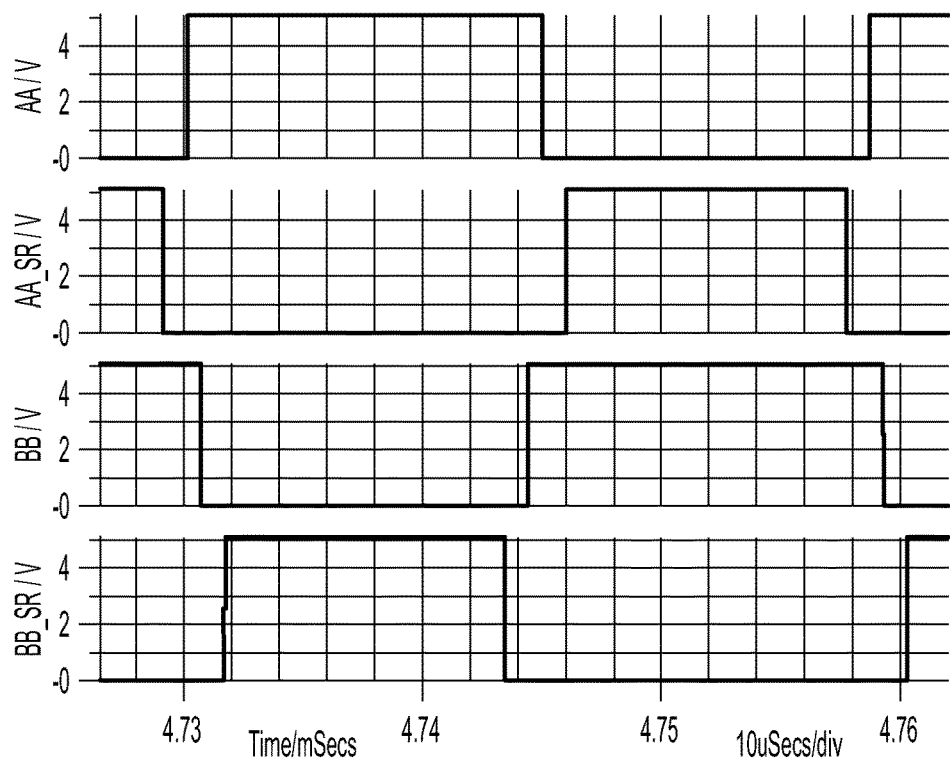
FIG. 3 is a timing diagram of control signals for controlling the switches of the multilevel buck power converter of FIG. 2.

The switches Q1-Q4 receive control signals generated by a control circuit (not shown). Specifically, the power switch Q1 receives a PWM control signal AA, the synchronous rectifier switch Q3 receives a PWM control signal AA_SR, the power switch Q2 receives a PWM control signal BB, and the synchronous rectifier switch Q4 receives a PWM control signal BB_SR. FIG. 3 illustrates the PWM control signals AA, BB, AA_SR, BB_SR for the switches Q1-Q4. As shown in FIG. 3, the control signals AA_SR, BB_SR are complementary to the control signals AA, BB, respectively. As such, if the duty cycle of the control signals AA, BB for the power switches Q1, Q2 is D, the duty cycle of the control signals AA_SR, BB_SR for the synchronous rectifier switches Q3, Q4 is 1-D.

In some examples, the buck circuits 204, 206 may be operated to maintain a phase shift therebetween. For example, and as shown in FIG. 3, the control signals AA, BB for the power switches Q1, Q2 are phase shifted 180 degrees relative to each other. In other examples, the phase shift may be different depending on, for example, the number of the buck circuits employed in the power converter 202.

Additionally, and as shown in FIG. 3, dead time may be placed between the high/low transitions of the control signals AA, AA_SR (e.g., on/off transitions of the switches Q1, Q3), and the between the on/off transitions of the control signals BB, BB_SR (e.g., on/off transitions of the switches Q2, Q4). The dead time between switching states may help prevent shoot through conditions, and play a role in achieving ZVS for the power switches Q1, Q2.

As explained above, reverse current may be used to achieve ZVS and optimize converter efficiency, particularly during light load conditions. For example, reverse current in the power converter 202 flows through the inductors L1, L2 from the converter's output during freewheeling periods, and is used by the synchronous rectifier switches Q3, Q4 to discharge the voltage (Vds) across the power switches Q1, Q2 to achieve ZVS. Specifically, when a load current drops below 50% of a peak-to-peak ripple current in the inductors L1, L2, current through the inductors L1, L2 will become negative (e.g., the ripple current–the load current). This causes reverse current to flow from the converter's output (e.g., the output capacitor Co) through the inductors L1, L2 and the rectifier switches Q3, Q4. For example, during the freewheeling period of the buck circuit 204, reverse current (shown with a dashed arrow 208 in FIG. 2) flows from the output capacitor Co through the inductor L1 and the rectifier switch Q3 when the load current drops below fifty percent of the peak-to-peak ripple current of the inductor L1.

Additionally, the inductors L1, L2 of FIG. 2 (and/or any one of the other inductors disclosed herein) may be selected to assist in achieving ZVS. For example, the value of the inductors L1, L2 may be selected for a desired peak-to-peak ripple current. Achieving the desired peak-to-peak ripple current may assist in creating reverse current conditions and a desired amount of reverse current, as explained above. When sufficient energy is stored in the inductors L1, L2 during the reverse current condition, ZVS of the power switches Q1, Q2 may be achieved. As such, values of the inductors L1, L2 may be selected for a desired peak-to-peak ripple current to ensure a sufficient amount of reverse current is generated at particular load levels to achieve ZVS.

As explained herein, the amount of reverse current may be controlled by adjusting the switching frequency. For example, when the switching frequency is fixed and the duty cycle of the synchronous rectifier switches Q3, Q4 is 1-D, the amount of reverse current will increase as the load decreases. As such, the energy stored in the inductors L1, L2 may exceed the amount necessary to achieve ZVS. However, if the switching frequency is adjusted, the peak-to-peak ripple current in the inductors L1, L2 changes causing the amount of reverse current to change. For example, increasing the switching frequency causes the peak-to-peak ripple current to decrease. As a result, the reverse current decreases.

Figure 4:
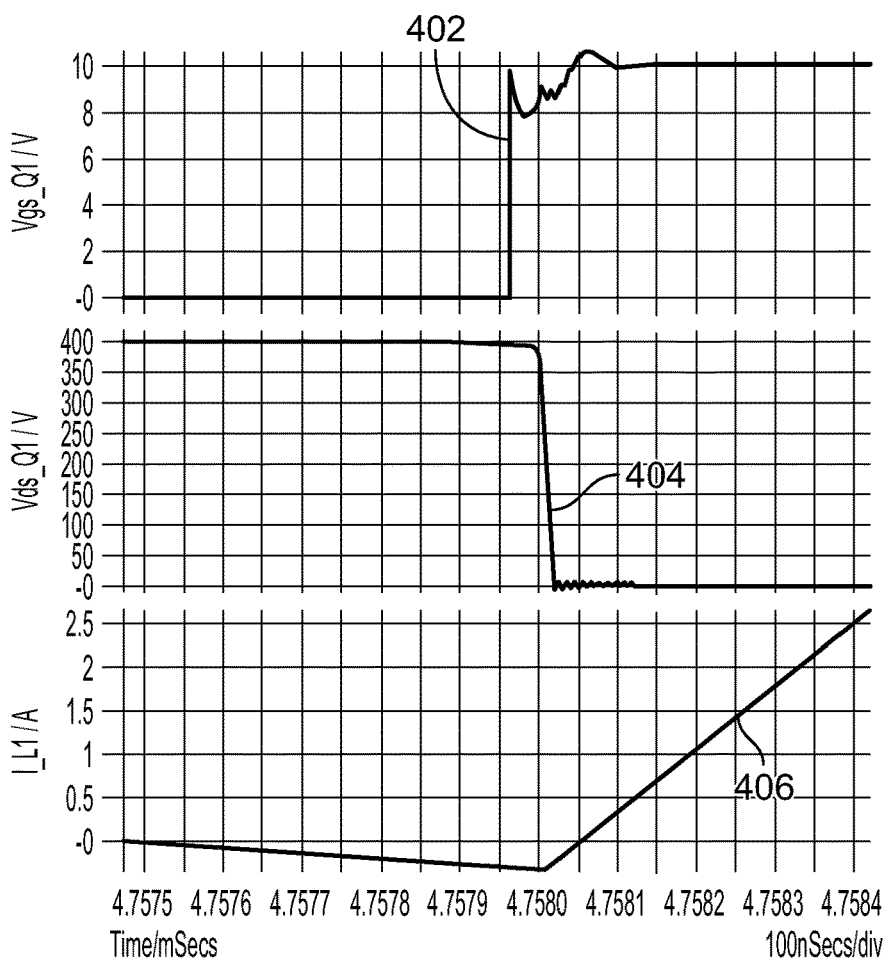
FIG. 4 is a graph of voltage waveforms associated with a power switch of the power converter of FIG. 2, where the switch does not achieve ZVS.
Figure 5:
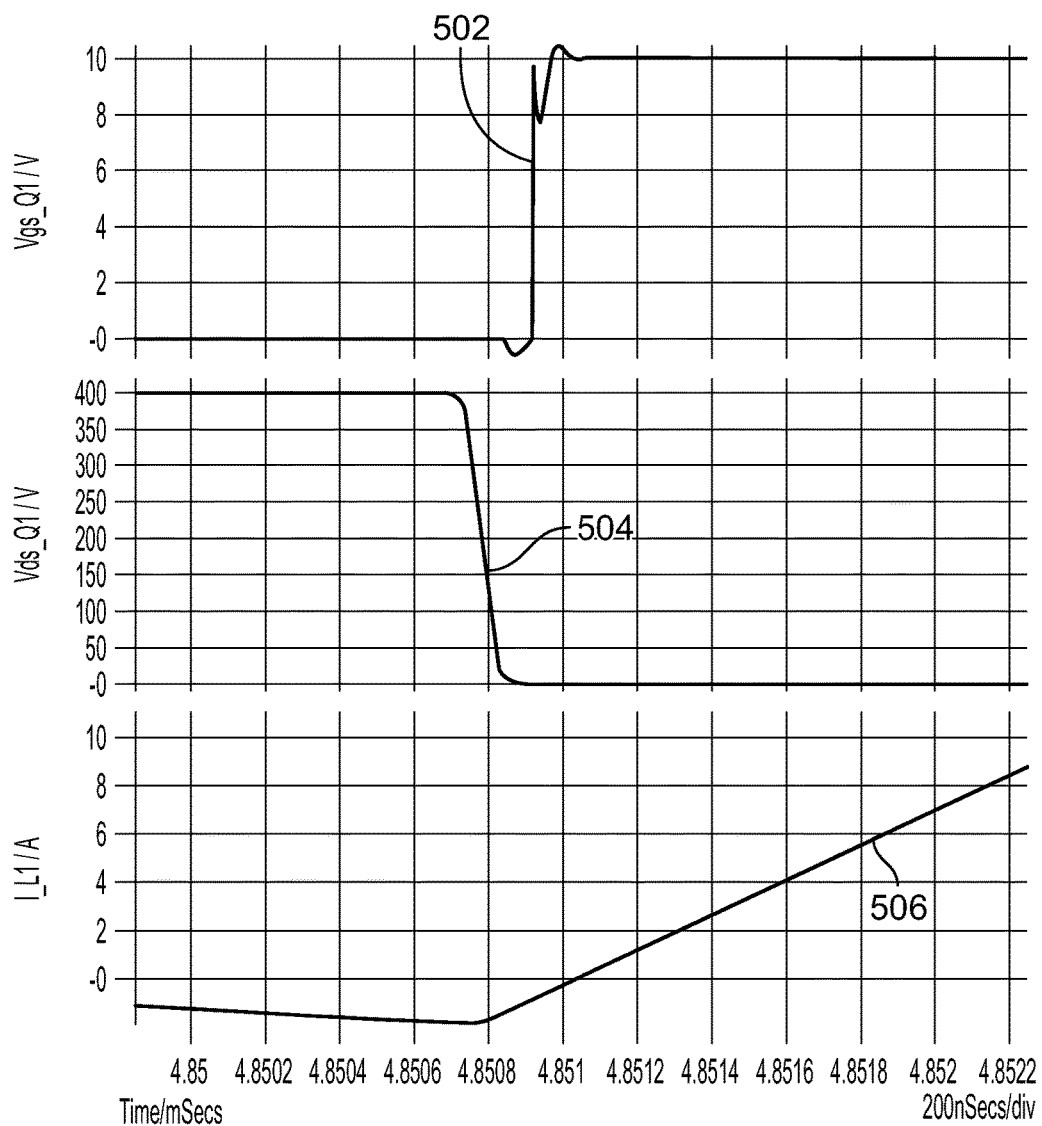
FIG. 5 is graph of voltage waveforms associated with a power switch of the power converter of FIG. 2, where the switch achieves ZVS.

For example, FIGS. 4 and 5 illustrate voltage and current waveforms associated with the buck circuit 204. Specifically, and as shown in FIGS. 4 and 5, waveforms 402, 502 represent the turn on voltage (Vgs) of the power switch Q1, waveforms 404, 504 represent the voltage (Vds) across the power switch Q1, and waveforms 406, 506 represent the current in the inductor L1 when the load current is 4.5 amps.

The switching frequency in the example of FIG. 4 is 35 kHz, and the switching frequency in the example of FIG. 5 is 30 kHz. As shown in FIG. 4, the voltage (Vds) across the power switch Q1 is not discharged before the voltage (Vgs) is increased to turn on the power switch Q1. As such, ZVS is not achieved in the power switch Q1 in the example of FIG. 4. However, when the switching frequency is decreased from 35 kHz to 30 kHz, the amount of reverse current is increased as shown in the waveforms 402, 502. This increased reverse current causes the voltage (Vds) across the power switch Q1 to discharge before the voltage (Vgs) is increased to turn on the power switch Q1, as shown in the waveforms 502, 504 of FIG. 5.

Referring back to FIGS. 2 and 3, the on times of the control signals AA, BB for the power switches Q1, Q2 may be overlapping or non-overlapping. For example, if a duty cycle of the control signals AA, BB exceeds a duty cycle threshold value, the on times of the control signals AA, BB for the power switches Q1, Q2 may overlap. If the duty cycle of the control signals AA, BB is below the duty cycle threshold value, the on times of the control signals AA, BB for the power switches Q1, Q2 may not overlap. In some examples, the duty cycle threshold value may be fifty percent (50%) or another suitable value.

Figure 6:
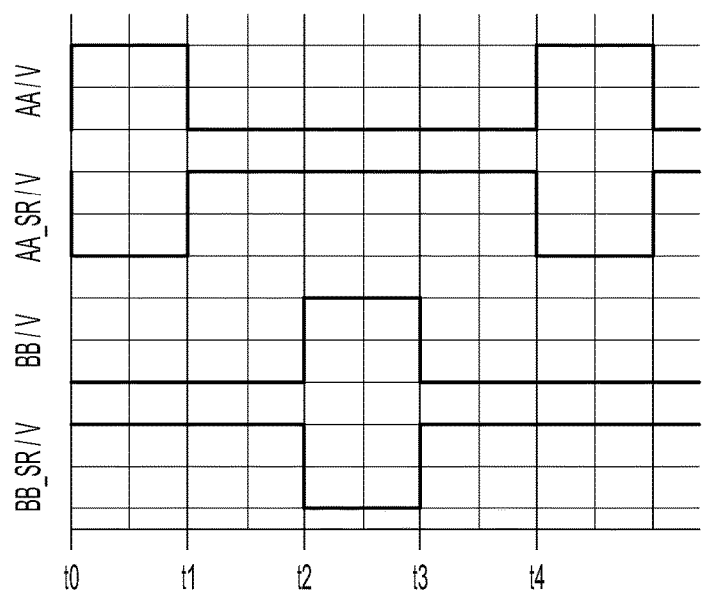
FIG. 6 is a timing diagram of control signals having non-overlapping on times for controlling the switches of the power converter of FIG. 2.
Figure 7:
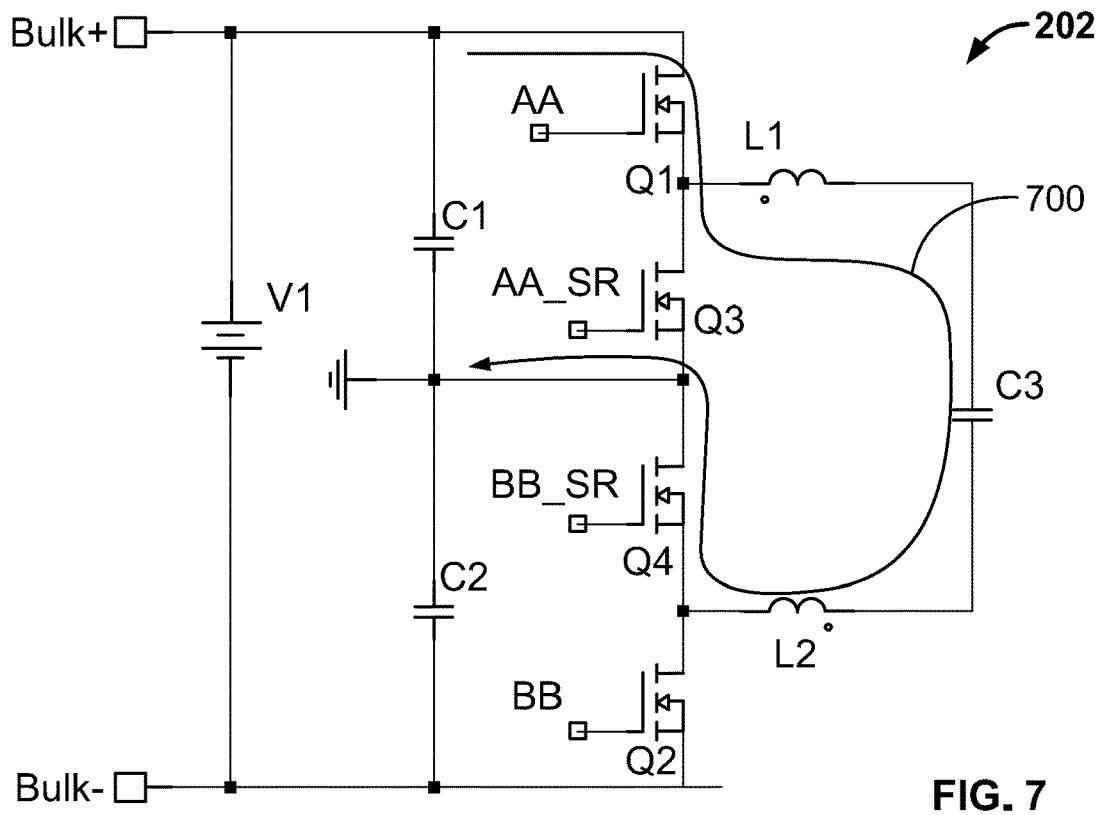
FIGS. 7-9 are circuit schematics of the power converter of FIG. 2, showing different current paths through the power converter when control signals having non-overlapping on times are employed.
Figure 8:
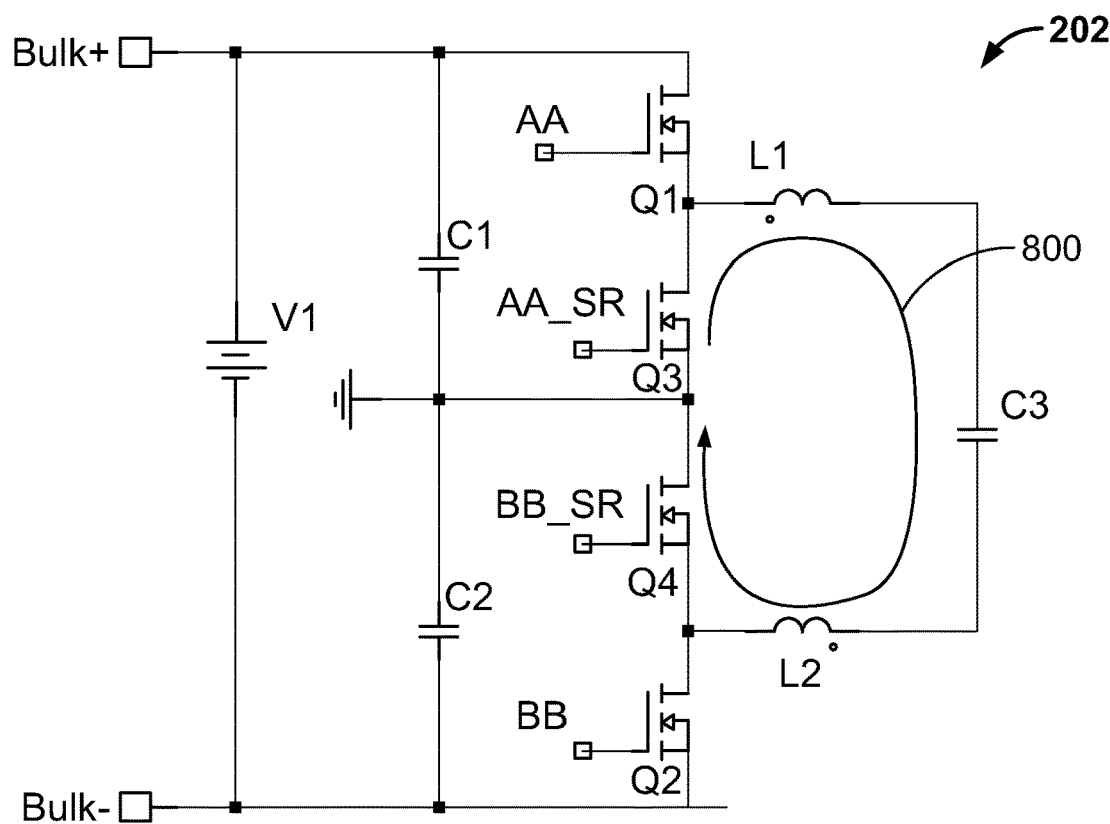
Figure 9:
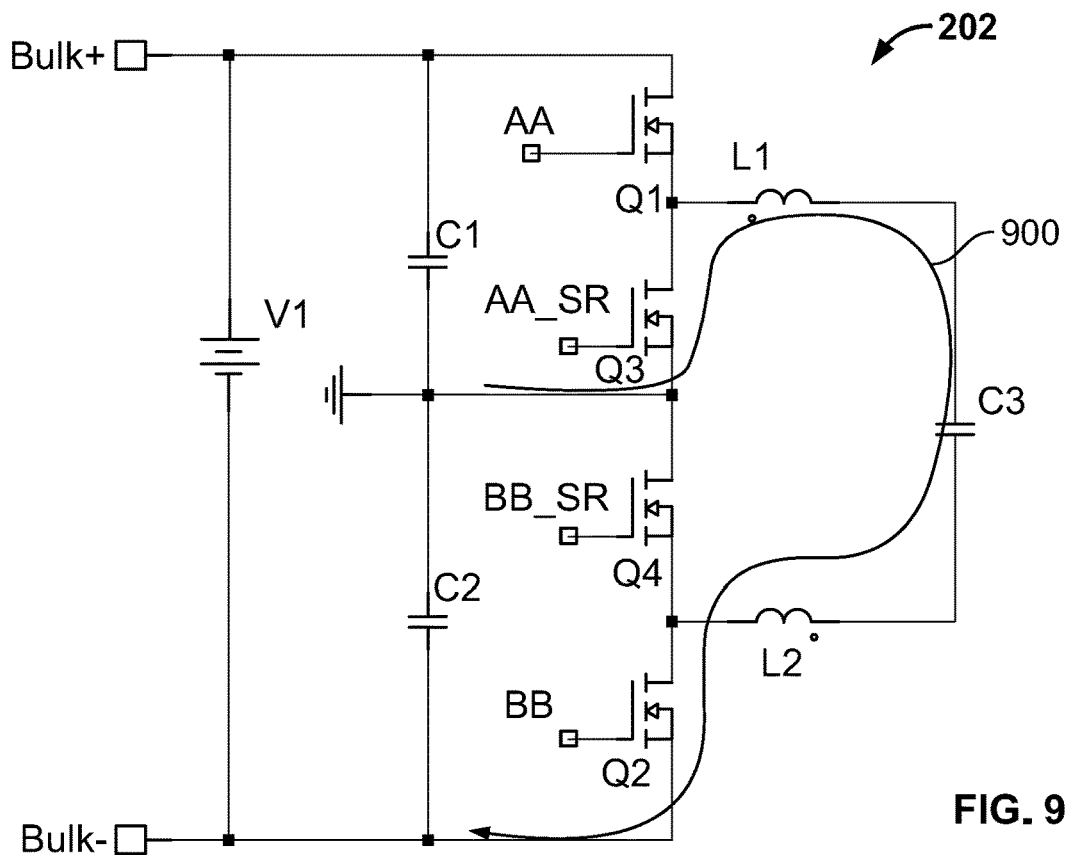

For example, FIG. 6 illustrates the PWM control signals AA, BB, AA_SR, BB_SR for the switches Q1-Q4 of FIG. 2, where the control signals AA, BB having non-overlapping on times. FIGS. 7-9 illustrate the current flow in the power converter 202 of FIG. 2 depending on the state of the control signals AA, BB, AA_SR, BB_SR. For example, during the sub-interval t0-t1 shown in FIG. 6, the control signals AA, BB_SR are high, and the control signals BB, AA_SR are low. As such, the switches Q1, Q4 are on, and current (shown by arrow 700) flows through the power switch Q1, the inductors L1, L2, and the synchronous rectifier switch Q4, as shown in FIG. 7. In this scenario, both inductors L1, L2 are energized from the capacitor C1 (e.g., half of the power converter's input voltage), and power is delivered to the power converter's output. During this time, the peak-to-peak ripple current of the inductors L1, L2 may be calculated with equation (1) below.

$$I_{PP} = \frac{\left(\frac{Vin}{2} - V_o\right) \cdot 2 \cdot D \cdot \frac{T_{sw}}{2}}{L1 + L2} \qquad \text{Equation (1)}$$

In equation (1) above, Vo is the output voltage of the power converter 202, D is the duty cycle (Vo/Vin), L1, L2 is inductance values of the inductors L1, L2, and Tsw is the switching period during this time interval. In this example, the expression "Vin/2" represents the voltage (Vc1) across the capacitor C1, and the expression "D*Tsw" represents the on time (Ton) for the control signals.

During the sub-interval t2-t3 shown in FIG. 6, the control signals BB, AA_SR are high, and the control signals AA, BB_SR are low. As such, the switches Q2, Q3 are on, and current (shown by arrow 900) flows through the synchronous rectifier switch Q3, the inductors L1, L2, and the power switch Q2, as shown in FIG. 9. In this scenario, both inductors L1, L2 are energized from the capacitor C2 (e.g., half of the power converter's input voltage), and power is delivered to the power converter's output. As such, the buck circuits 204, 206 alternate in taking power from the input capacitors C1, C2 ensuring a balanced power draw from the input capacitors C1, C2. During the sub-interval t2-t3, the peak-to-peak ripple current of the inductors L1, L2 may be calculated with equation (1) above if the voltage across the capacitor C2 is equal to the voltage across the capacitor C1.

During the sub-intervals t1-t2, t3-t4 shown in FIG. 6, the control signals AA_SR, BB_SR are high, and the control signals AA, BB are low. As such, the synchronous rectifier switches Q3, Q4 are on, and the power switches Q1, Q2 are off thereby disconnecting the inductors L1, L2 and the power converter's output from the power converter's input. As a result, the inductors L1, L2 begin freewheeling. During this time, current (shown by arrow 800) flows in a loop through the synchronous rectifier switches Q3, Q4 and the inductors L1, L2, as shown in FIG. 8. During these sub-intervals, the freewheeling period Tfw may be calculated with equation (2) below, and the peak-to-peak ripple current of the inductors L1, L2 may be calculated with equation (3) below.

$$T_{FW} = \frac{(1 - 2 \cdot D) \cdot T_{sw}}{2} \qquad \text{Equation (2)}$$

$$I_{PP} = \frac{V_o \cdot T_{FW}}{L1 + L2} = \frac{V_0 \cdot (1 - 2 \cdot D) \cdot \frac{T_{sw}}{2}}{L1 + L2} \qquad \text{Equation (3)}$$

Figure 10:
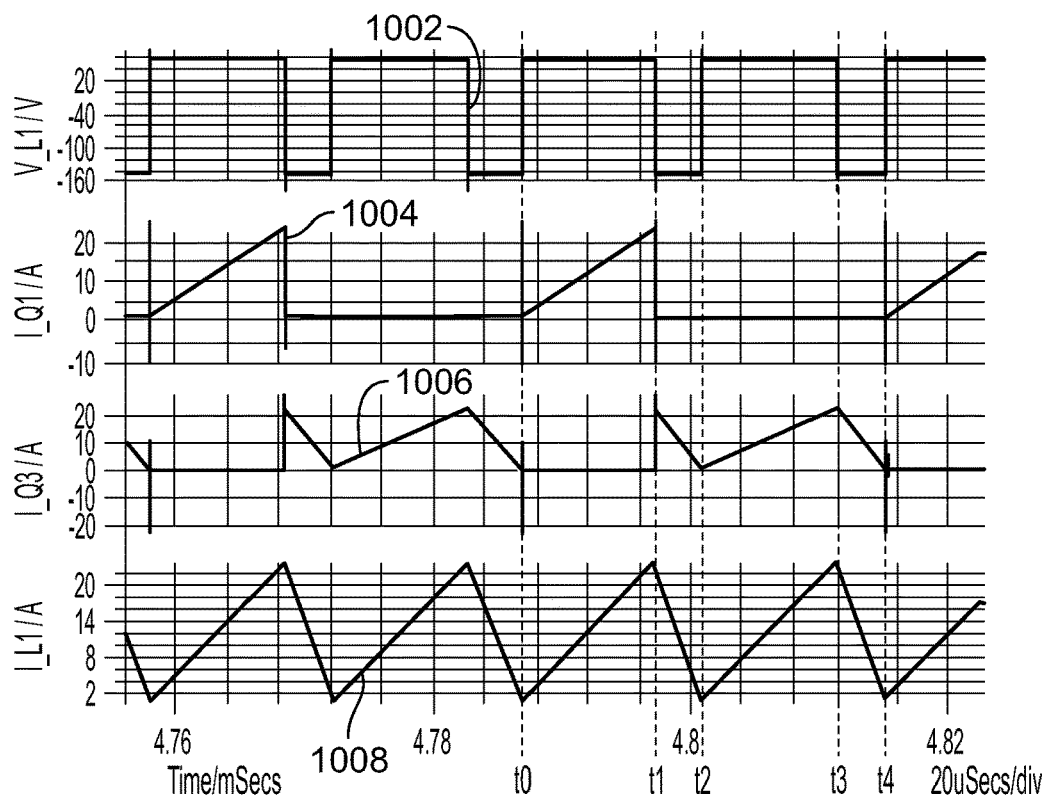
FIG. 10 is a graph of voltage and current waveforms associated with the power converter of FIG. 2 when control signals having non-overlapping on times are employed.

FIG. 10 illustrates various waveforms of voltage and current characteristics for the buck circuit 204 of FIG. 2 when the control signals AA, BB have non-overlapping on times. Specifically, the waveforms 1002, 1004, 1006, 1008 of FIG. 10 represent the voltage across the inductor L1, the current through the power switch Q1, the current through the synchronous rectifier switch Q3, and the current through the inductor L1, respectively, during the time intervals t0-t1, t1-t2, t2-t3, t3-t4 explained above.

Figure 11:
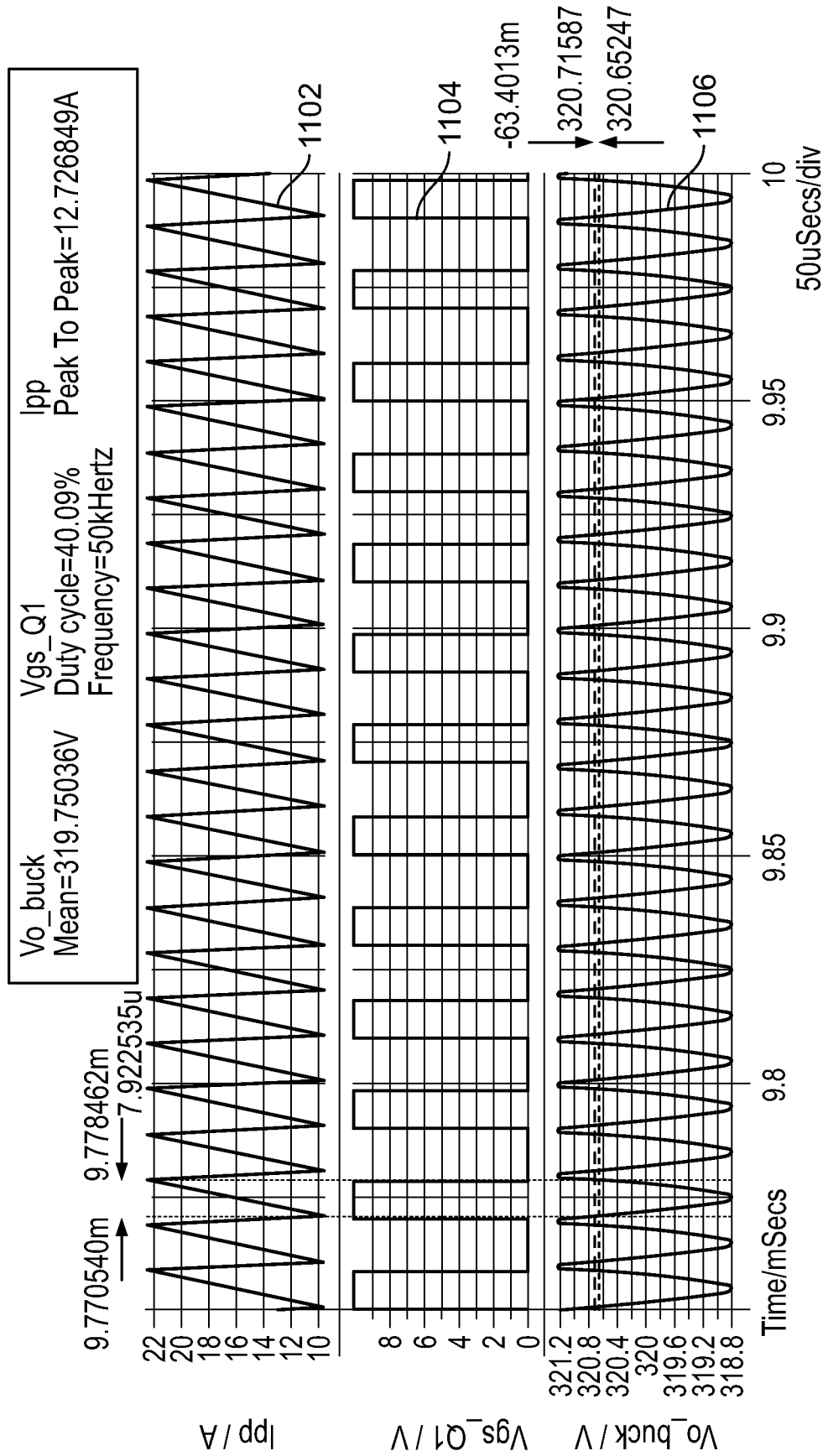
FIG. 11 is a graph of simulated waveforms for a peak-to-peak ripple current, a turn on voltage for a power switch of the power converter of FIG. 2, and an output voltage of the power converter of FIG. 2, when control signals having non-overlapping on times are employed.

In one particular example, the input source V1 provides a voltage of 800 V to the multilevel DC-DC buck power converter 202 of FIG. 2, and the inductors L1, L2 have an inductance of 25 μH. Additionally, the power switches Q1, Q2 are switched at a switching frequency Fs of 50 kHz. In such examples, the switching period Tsw is 20 μsec (e.g., 1/50 kHz), and the multilevel DC-DC buck power converter 202 provides an output voltage Vo of 320 V. In this example, the duty cycle D of the control signals AA, BB may be calculated by dividing the output voltage Vo by the input voltage Vin as explained above, the on time Ton of the control signals AA, BB may be calculated by multiplying the duty cycle D and the switching period Tsw, and the freewheeling period Tfw may be calculated using equation (2) above. As such, in this particular example, the duty cycle D is 0.4 (e.g., 320V/800V), the on time Ton of the control signals AA, BB is 8 μsec (e.g., 0.4*20 μsec), and the freewheeling period Tfw is 2 μsec. The peak-to-peak ripple current of the inductors L1, L2 during the on times of the power switches Q1, Q2 (e.g., during the sub-intervals t0-t1, t2-t3) may be calculated using equation (1) above, and the peak-to-peak ripple current of the inductors L1, L2 during the freewheeling periods Tfw (e.g., during the sub-intervals t1-t2, t3-t4) may be calculated using equation (3) above. Thus, in this particular example, the peak-to-peak ripple current during the on times of the power switches Q1, Q2 is 12.8 amps, and the peak-to-peak ripple current during the freewheeling periods Tfw is 12.8 amps The peak-to-peak ripple current calculations references above may be verified through simulations. For example, FIG. 11 illustrates various simulated waveforms of voltage and current characteristics for the buck circuit 204 of FIG. 2 when the control signals AA, BB have non-overlapping on times. Specifically, waveforms 1102, 1104, 1106 of FIG. 11 represent the peak-to-peak ripple current in the inductor L1, the turn on voltage (e.g., the control signal AA) for the power switch Q1, and the output voltage Vo of the multilevel DC-DC buck power converter 202, respectively. As shown, when the power switch Q1 is operated with a 40% duty cycle at 50 kHz, the mean value of the output voltage is about 319.75 V, and the peak-to-peak ripple current is about 12.7.

Figure 12:
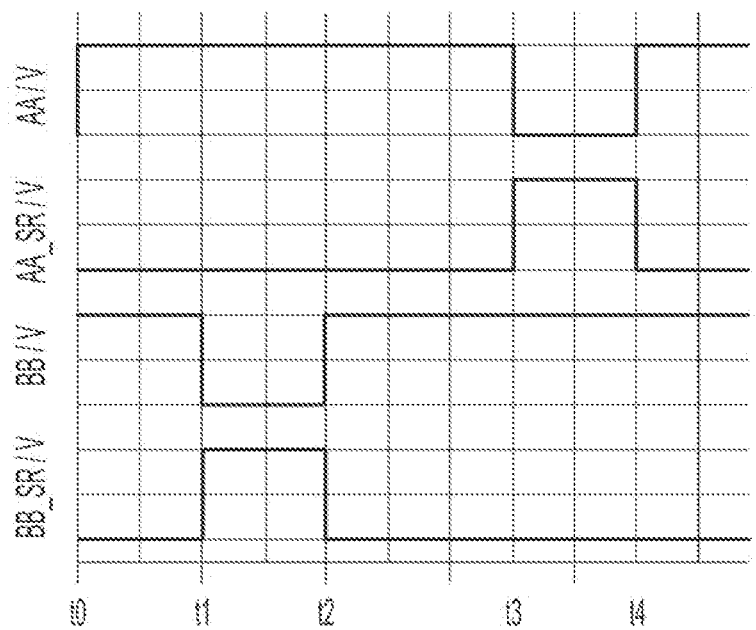
FIG. 12 is a timing diagram of control signal waveforms having overlapping on times for controlling the switches of the multilevel buck power converter of FIG. 2.
Figure 13:
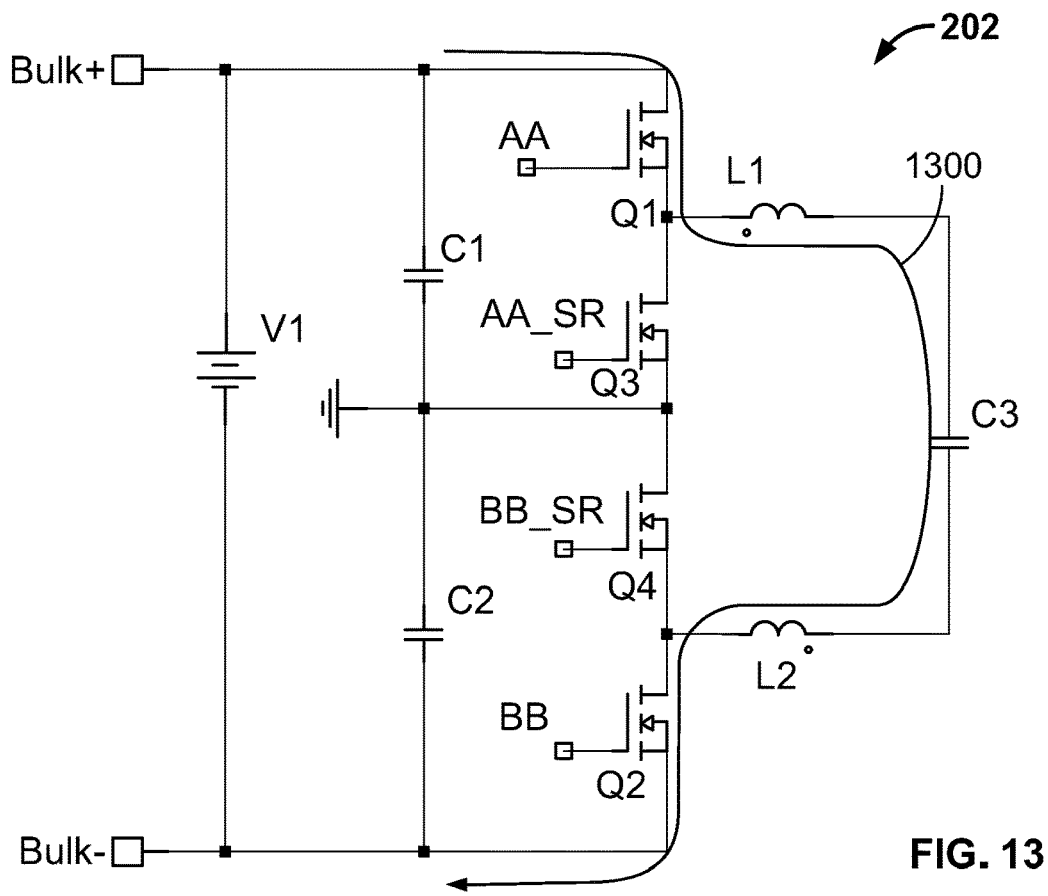
FIGS. 13-15 are circuit schematics of the power converter of FIG. 2, showing different current paths through the power converter when control signals having overlapping on times are employed.
Figure 14:
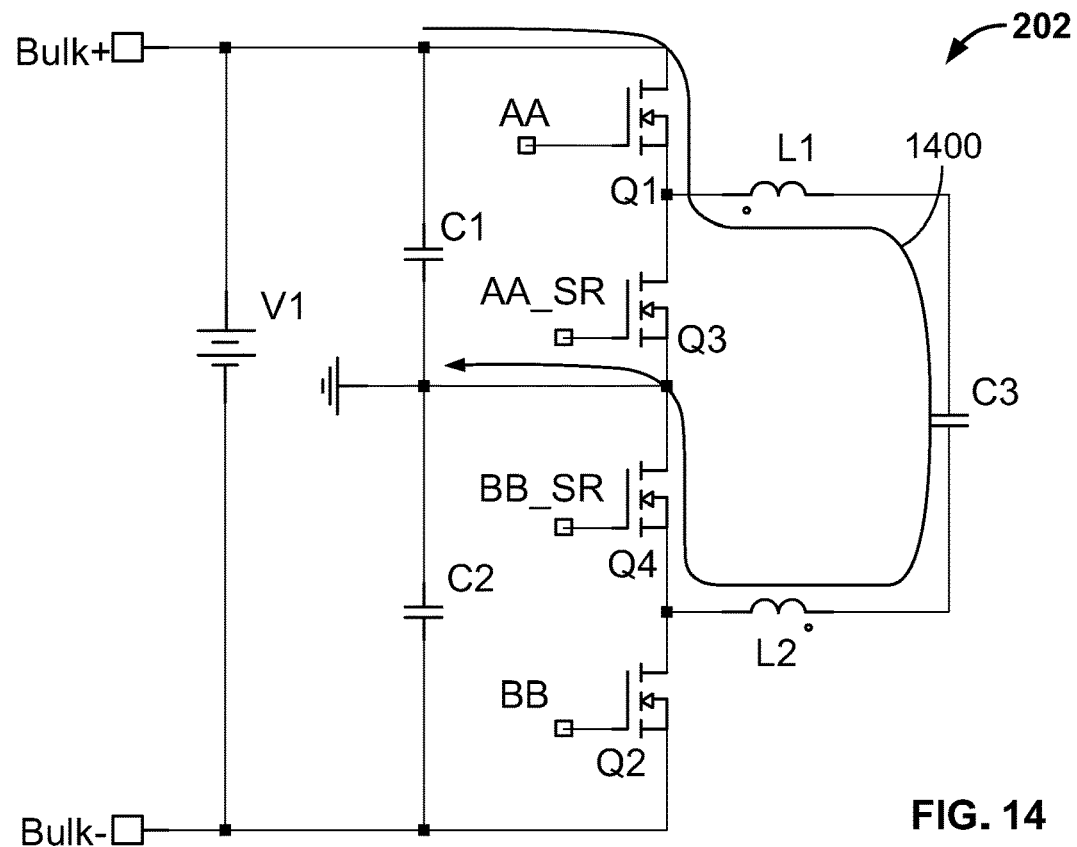
Figure 15:
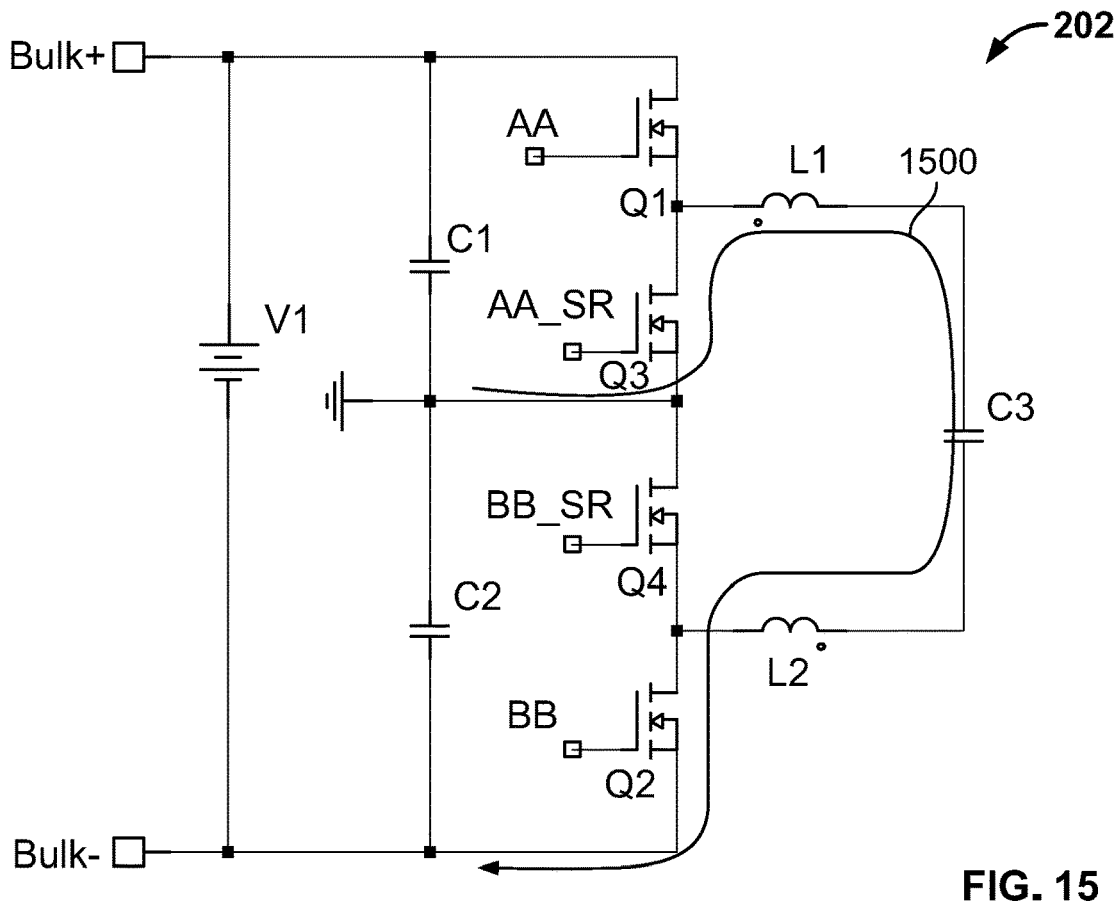

FIG. 12 illustrates the PWM control signals AA, BB, AA_SR, BB_SR for the switches Q1-Q4 of FIG. 2, where the control signals AA, BB having overlapping on times. FIGS. 13-15 illustrate the current flow in the power converter 202 of FIG. 2 depending on the state of the control signals AA, BB, AA_SR, BB_SR. For example, during the sub-intervals t0-t1, t2-t3 shown in FIG. 12, the control signals AA, BB are high, and the control signals AA-SR, BB_SR are low. As such, the power switches Q1, Q2 are on, and current (shown by arrow 1300) flows through the power switches Q1, Q2 and the inductors L1, L2, as shown in FIG. 13. In this scenario, both inductors L1, L2 are energized from the total input bus voltage of the power converter 202 (e.g., the voltage provided by the input source V1). During these sub-intervals, the peak-to-peak ripple current of the inductors L1, L2 may be calculated with equation (4) below.

$$I_{PP} = \frac{(V_{C1} + V_{C2} - V_o) \cdot T_{ON}}{L1 + L2} = \frac{(Vin - V_o) \cdot (D - 0.5) \cdot T_{sw}}{L1 + L2} \quad \text{Equation (4)}$$

In equation (4) above, Vin is the input voltage from the source V1, Vc1, Vc2 are voltages across the capacitors C1, C2, Vo is the output voltage of the power converter 202, D is the duty cycle (Vo/Vin), and Tsw is the switching period during this time interval.

During the sub-interval t1-t2 shown in FIG. 12, the control signals AA, BB_SR are high, and the control signals BB, AA_SR are low. As such, the switches Q1, Q4 are on, and current (shown by arrow 1400) flows through the power switch Q1, the inductors L1, L2, and the synchronous rectifier switch Q4, as shown in FIG. 14. In this scenario, both inductors L1, L2 are energized from the capacitor C1 (e.g., half of the power converter's input voltage), and freewheel with the return path to the buck circuit 204. During this sub-interval, the freewheeling period Tfw may be calculated with equation (5) below, and the peak-to-peak ripple current of the inductors L1, L2 may be calculated with equation (6) below.

$$T_{FW} = (1 - D) \cdot T_{sw} \quad \text{Equation (5)}$$

$$I_{PP} = \frac{(V_{C1} - V_O) \cdot T_{FW}}{L1 + L2} = \frac{\left(V_O - \frac{Vin}{2}\right) \cdot (1 - D) \cdot T_s}{L1 + L2} \quad \text{Equation (6)}$$

During the sub-interval t3-t4 shown in FIG. 12, the control signals AA_SR, BB are high, and the control signals AA, BB_SR are low. As such, the switches Q2, Q3 are on, and current (shown by arrow 1500) flows through the synchronous rectifier switch Q3, the inductors L1, L2, and the power switch Q2, as shown in FIG. 15. During this time, both inductors L1, L2 are energized from the capacitor C2 (e.g., half of the power converter's input voltage), and freewheel with the return path to the buck circuit 206. During the sub-interval t3-t4, the peak-to-peak ripple current of the inductors L1, L2 may be calculated with equation (6) above if the voltage across the capacitor C2 is equal to the voltage across the capacitor C1.

Figure 16:
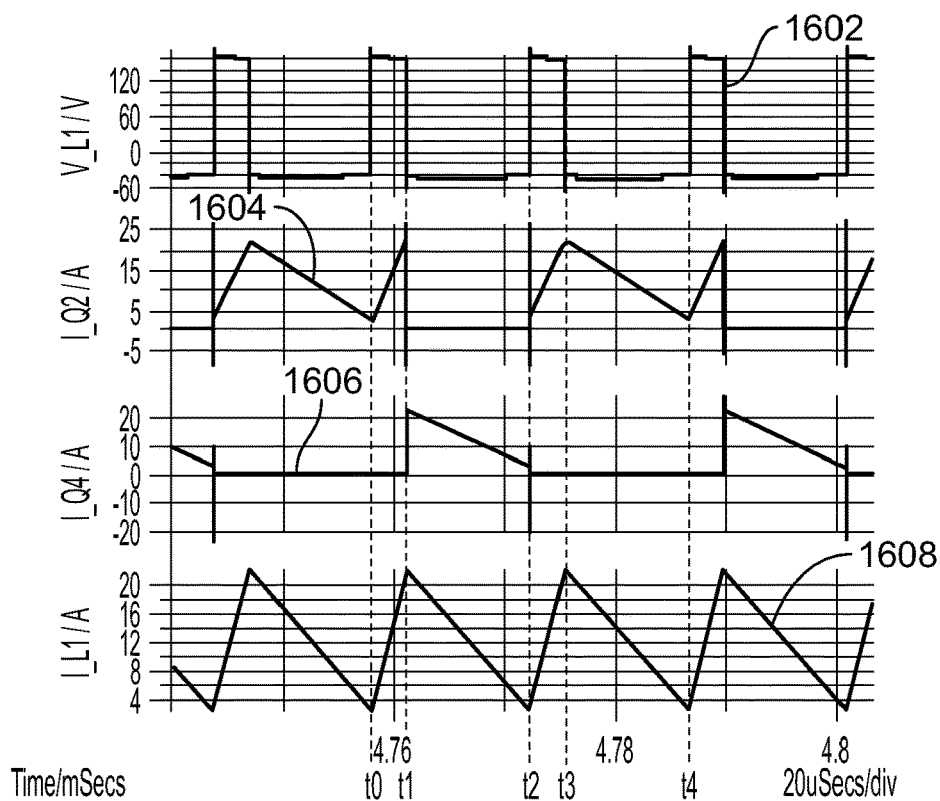
FIG. 16 is a graph of voltage and current waveforms associated with the power converter of FIG. 2 when control signals having overlapping on times are employed.

FIG. 16 illustrates various waveforms of voltage and current characteristics for the buck circuit 204 of FIG. 2 when the control signals AA, BB have overlapping on times. Specifically, the waveforms 1602, 1604, 1606, 1608 of FIG. 16 represent the voltage across the inductor L1, the current through the power switch Q2, the current through the synchronous rectifier switch Q4, and the current through the inductor L1, respectively, during the time intervals t0-t1, t1-t2, t2-t3, t3-t4 explained above.

As explained above, the multilevel DC-DC buck power converter 202 may receive an 800 input voltage, and the inductors L1, L2 may have an inductance of 25 μH. Additionally, the power switches Q1, Q2 may be operated at a switching frequency Fs of 50 kHz, as explained above. In such examples, the switching period Tsw is 20 μsec (e.g., ⅟50 kHz), and the multilevel DC-DC buck power converter 202 provides an output voltage Vo of 500 V. In this example, the duty cycle D of the control signals AA, BB may be calculated by dividing the output voltage Vo by the input voltage Vin as explained above, the on time Ton of the control signals AA, BB may be calculated based on the duty cycle D and the switching period Tsw, and the freewheeling period Tfw may be calculated using equation (5) is above. As such, in this particular example, the duty cycle D is 0.625 (e.g., 500V/800V), the on time Ton of the control signals AA, BB is 2.5 μsec (e.g., (D–0.5)*Tsw=(0.625–0.5)*20 μsec), and the freewheeling period Tfw is 7.5 μsec. The peak-to-peak ripple current of the inductors L1, L2 during the on times of the power switches Q1, Q2 (e.g., during the sub-intervals t0-t1, t2-t3) may be calculated using equation (4) above, and the peak-to-peak ripple current of the inductors L1, L2 during the freewheeling periods Tfw (e.g., during the sub-intervals t1-t2, t3-t4) may be calculated using equation (6) above. Thus, in this particular example, the peak-to-peak ripple current during the on times of the power switches Q1, Q2 is 15 amps, and the peak-to-peak ripple current during the freewheeling periods Tfw is 15 amps.

Figure 17:
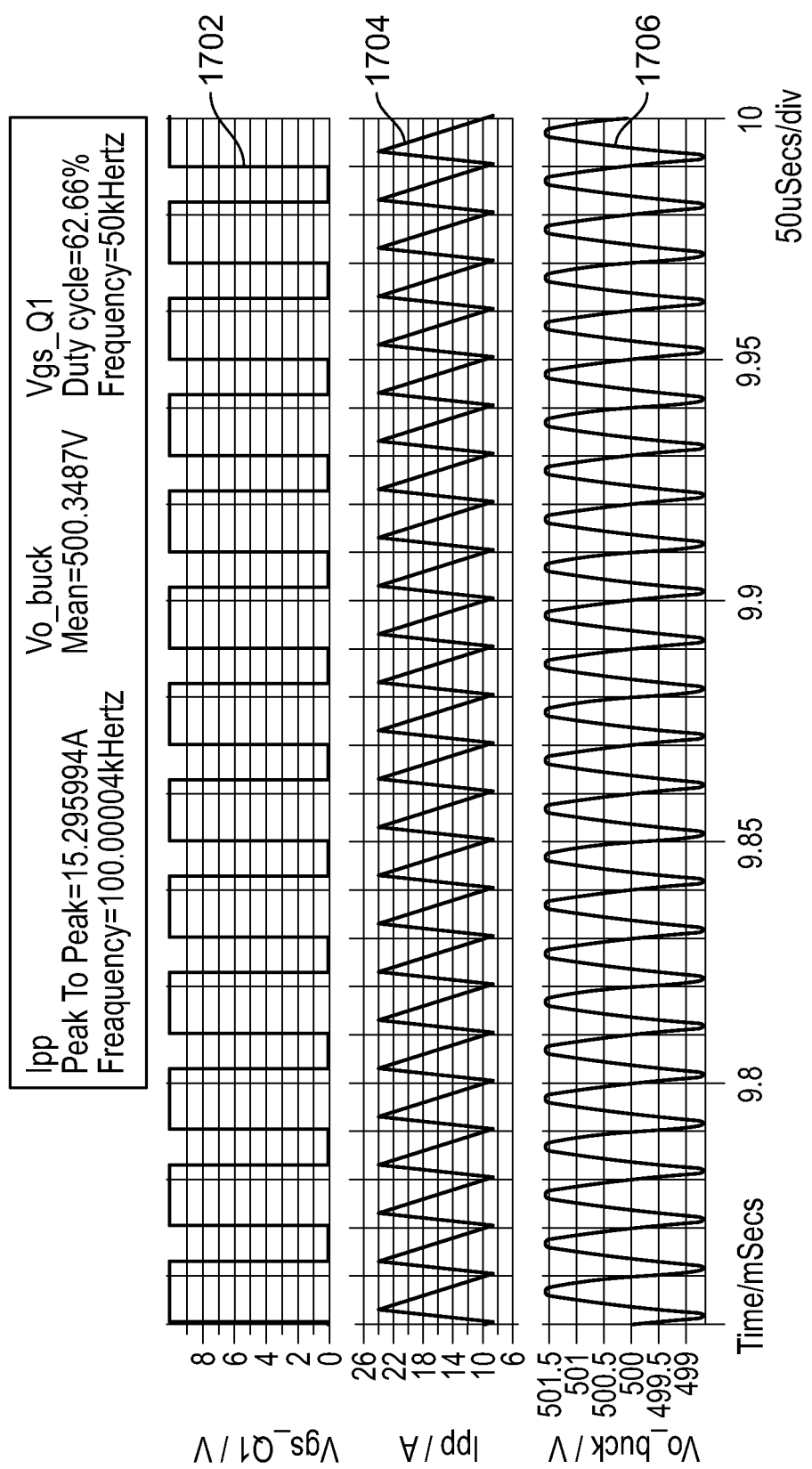
FIG. 17 is a graph of simulated waveforms for a peak-to-peak ripple current, a turn on voltage for a power switch of the power converter of FIG. 2, and an output voltage of the power converter of FIG. 2, when control signals having overlapping on times are employed.

These peak-to-peak ripple current calculations references above may be verified through simulations. For example, FIG. 17 illustrates various simulated waveforms of voltage and current characteristics for the buck circuit 204 of FIG. 2 when the control signals AA, BB have overlapping on times. Specifically, waveforms 1702, 1704, 1706 of FIG. 11 represent the turn on voltage (e.g., the control signal AA) for the power switch Q1, the peak-to-peak ripple current, and the output voltage Vo of the multilevel DC-DC buck power converter 202, respectively. As shown, when the power switch Q1 is operated with a duty cycle of about 62.66% at a frequency of 50 kHz, the mean value of the output voltage is about 500 V, and the peak-to-peak ripple current is about 15.3.

In the examples of FIGS. 10, 11, 16 and 17, the frequency of the inductor ripple current is about twice the switching frequency (Fs) of the power switches Q1, Q2. As such, in these particular examples, the frequency of the inductor ripple current is about 100 kHz. In such examples, the size (e.g., inductance) of the inductors L1, L2 may be reduced (e.g., by 50%) as compared to conventional interleaved buck power converters.

In some examples, switches in the multilevel DC-DC buck power converter 202 of FIG. 2 may experience reverse recovery losses and/or switching losses. For example, when the power converter 202 is operated in CCM, the synchronous rectifier switches Q3, Q4 may suffer from reverse recovery losses and the power switches Q1, Q2 may experience turn on and/or off switching losses. Specifically, the synchronous rectifier switches Q3, Q4 conduct current through their body diodes for a small period of time (e.g., during the dead time) before the switches Q3, Q4 turn off to avoid shoot through current. The diode conduction may generate reverse recovery current and cause the reverse recovery losses. The reverse recovery losses and the switching losses may be reduced (and sometimes eliminated) if GaN type switching devices are employed.

The power supplies disclosed herein may include multiple power converter stages. For example, the multilevel DC-DC buck power converters disclosed herein may be one of the power converter stages. Other power converter stages may include, for example, resonant power converters.

Figure 18:
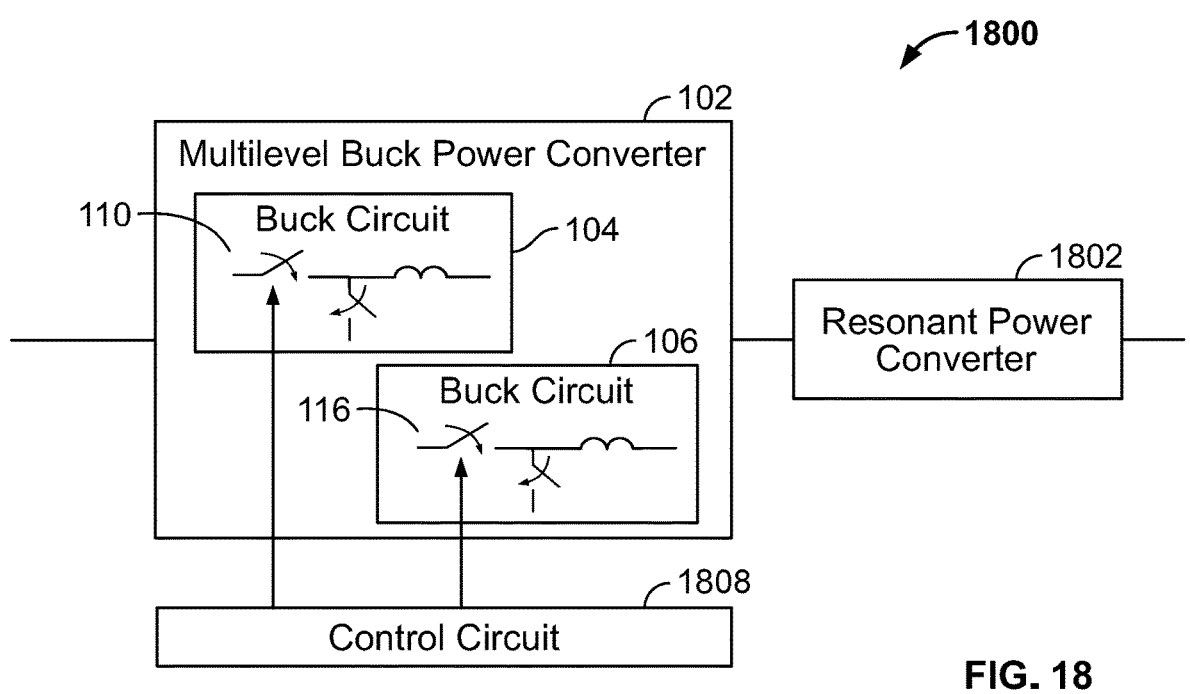
FIG. 18 is a block diagram of a SMPS including a multilevel buck power converter and a resonant power converter according to another example embodiment.

For example, FIG. 18 illustrates a switched mode power supply 1800 including the multilevel buck power converter 102 of FIG. 1, a resonant power converter 1802, and a control circuit 1808 for controlling the power switches 110, 116 of the buck circuits 104, 106. In some examples, the control circuit 1808 of FIG. 18 may function similar to the control circuit 108 of FIG. 1. In such examples, the control circuit 1808 may generate control signals for the power switches 110, 116 to control the multilevel DC-DC buck power converter 102 in a CCM so that reverse current flows in the buck circuits 104, 106 (as explained above), and then adjust a switching frequency of the control signals to control the amount of reverse current to achieve ZVS of the power switches 110, 116. In other examples, the control circuit 1808 of FIG. 18 may function another suitable manner, and reverse current may or may not flow in the buck circuits 104, 106.

As shown in FIG. 18, the resonant power converter 1802 is coupled to the multilevel buck power converter 102. Specifically, in the particular example of FIG. 18, the resonant power converter 1802 is coupled to the output of the multilevel buck power converter 102. In other examples, the resonant power converter 1802 may be coupled to the output of the multilevel buck power converter 102 via, for example, an intervening component, power converter stage, etc.

In the example of FIG. 18, the resonant power converter 1802 may be a fixed frequency converter. For example, although not shown in FIG. 18, the control circuit 1808 and/or another suitable control circuit may generate control signals having a fixed switching frequency for one or more power switches in the resonant power converter 1802. In other examples, the power switches in the resonant power converter 1802 may have a varying switching frequency, may be controlled with an adjustable switching frequency, etc.

Figure 19:
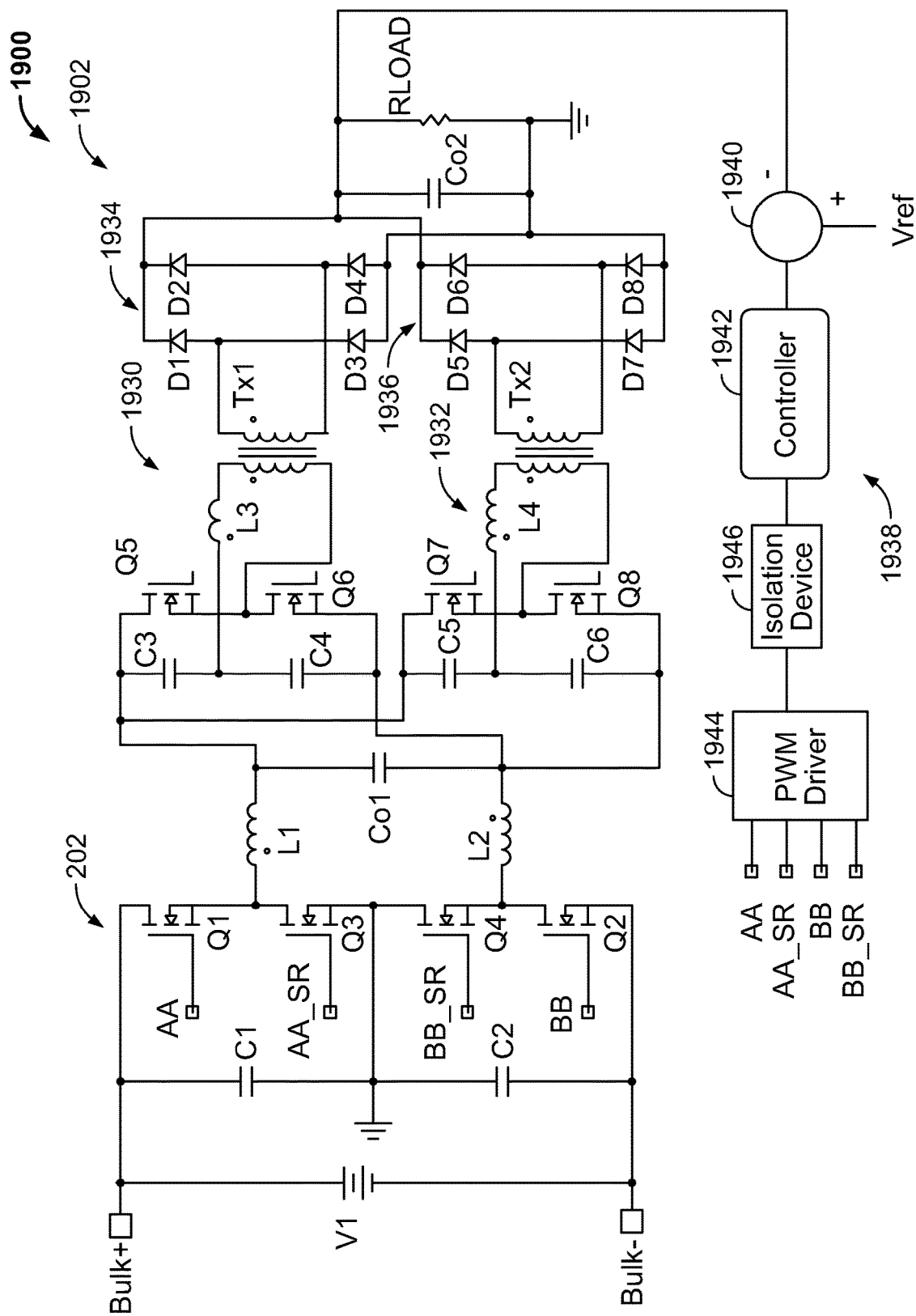
FIG. 19 is a circuit schematic of a SMPS including a multilevel buck power converter and an interleaved resonant bus power converter, according to another example embodiment.

The resonant power converter 1802 may have any suitable resonant topology including, for example, an interleaved resonant bus converter topology, a non-interleaved resonant bus converter topology, etc. For example, FIG. 19 illustrates a switched mode power supply 1900 including an interleaved resonant bus power converter 1902 coupled to an output of the multilevel DC-DC buck power converter 202 of FIG. 2. In the example of FIG. 19, the power supply 1900 further includes a capacitor Co1 coupled between the power converter 202 and the resonant power converter 1902, and an output capacitor Co2 coupled between the resonant power converter 1902 and a load (e.g., shown as a resistor Rload).

The switches Q1-Q4 of the power converter 202 shown in FIG. 19 may be optionally controlled in a similar manner as explained above. For example, and as shown in FIG. 19, the power supply 1900 includes a control circuit 1938 for controlling the switches Q1-Q4. Specifically, the control circuit 1938 includes a comparator 1940, a controller 1942 (e.g., a PID controller, a PI controller, etc.), a PWM driver 1944, and an isolation device 1946 (e.g., an isolation transformer, an opto-coupler, etc.) coupled between the controller 1942 and the PWM driver 1944. The comparator 1940 generates an error signal based on a signal representing the output voltage of the power supply and a reference signal Vref. In such examples, the PWM driver 1944 may generate the PWM control signals AA, BB, AA_SR, BB_SR based on the error signal for controlling the switches Q1-Q4 as explained above and/or in another suitable manner.

As shown in FIG. 19, the interleaved resonant bus power converter 1902 includes two subconverters 1930, 1932 coupled in parallel. The subconverter 1930 includes a transformer TX1, power switches Q5, Q6 coupled to a primary winding of the transformer TX1, capacitors C3, C4 coupled between the power switches Q5, Q6 and the output of the power converter 202, an inductor L3 coupled to the primary winding of the transformer TX1, and a rectification circuit 1934 having diodes D1, D2, D3, D4 coupled to a secondary winding of the transformer TX1. The subconverter 1932 includes a similar arrangement of components as the subconverter 1930, but includes a transformer TX2, power switches Q7, Q8, capacitors C5, C6, an inductor L4, and a rectification circuit 1936 having diodes D5, D6, D7, D8. The power switches of each subconverter 1930, 1932 are arranged in a half bridge topology. Additionally, the inductor, the capacitors, and the transformer's primary winding of each subconverter 1930, 1932 form a resonant tank circuit.

In the particular example of FIG. 19, the diodes of the rectification circuits 1934, 1936 are arranged as a full bridge rectifier. In other examples, the rectification circuits 1934, 1936 may include two diodes arranged as a half bridge rectifier. In some examples, the rectification circuits 1934, 1936 may include one or more other suitable switching devices such as synchronous rectifier switches instead of diodes.

Figure 20:
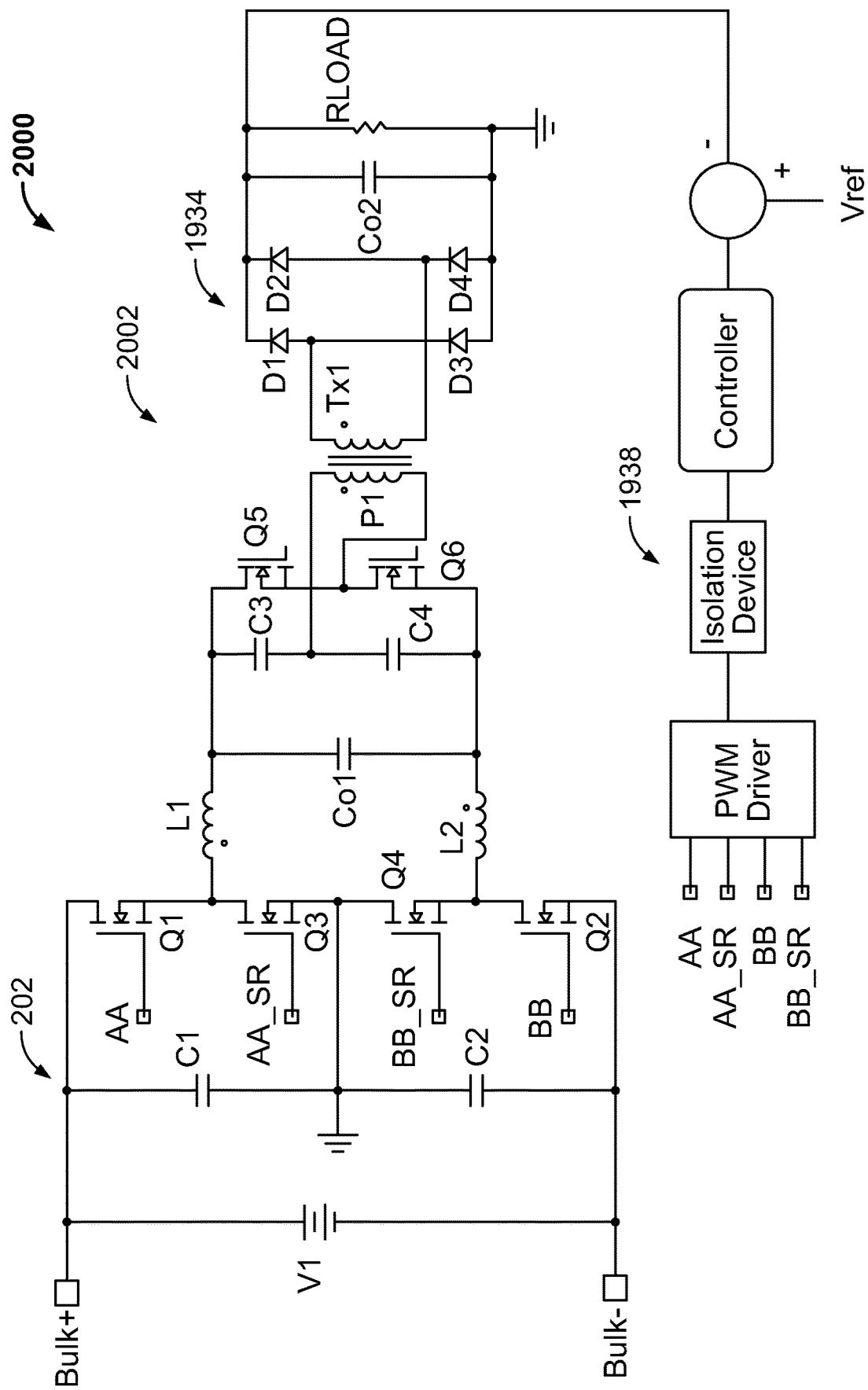
FIG. 20 is a circuit schematic of a SMPS including a multilevel buck power converter and a non-interleaved resonant bus power converter, according to another example embodiment.

FIG. 20 illustrates a switched mode power supply 2000 similar to the power supply 1900 of FIG. 19, but including a non-interleaved resonant bus power converter 2002 instead of the interleaved resonant bus power converter 1902. The power supply 2000 includes the capacitors Co1, Co2, and the control circuit 1938 of FIG. 19. Specifically, and as shown in FIG. 20, the capacitor Co1 is coupled between the power converter 202 and the resonant power converter 2002, the output capacitor Co2 coupled between the resonant power converter 2002 and the load, and the control circuit 1938 generates the PWM control signals AA, BB, AA_SR, BB_SR for controlling the switches Q1-Q4 as explained above.

The non-interleaved resonant bus power converter 2002 includes a substantially similar arrangement of components as the subconverter 1930 of FIG. 19. For example, the power converter 2002 includes the transformer TX1, the power switches Q5, Q6, the capacitors C3, C4, and the rectification circuit 1934 of FIG. 19. The capacitors C3, C4 and the transformer's primary winding form a resonant tank circuit.

In some examples, the resonant power converters 1902, 2002 of FIGS. 19 and 20 provide isolation with fixed gains for the outputs of the power supplies 1900, 2000 (e.g., the voltage across the resistor Rload). For example, the power switches of the resonant power converters 1902, 2002 may be switched at a fixed switching frequency to achieve the fixed gains. Additionally, in the example of FIGS. 19 and 20, the control loop of the control circuit 1938 is closed on the multilevel DC-DC buck power converter 202. As such, the outputs of the power supplies may be adjusted, regulated, etc. by controlling the PWM of the power converter 202.

Figure 21:
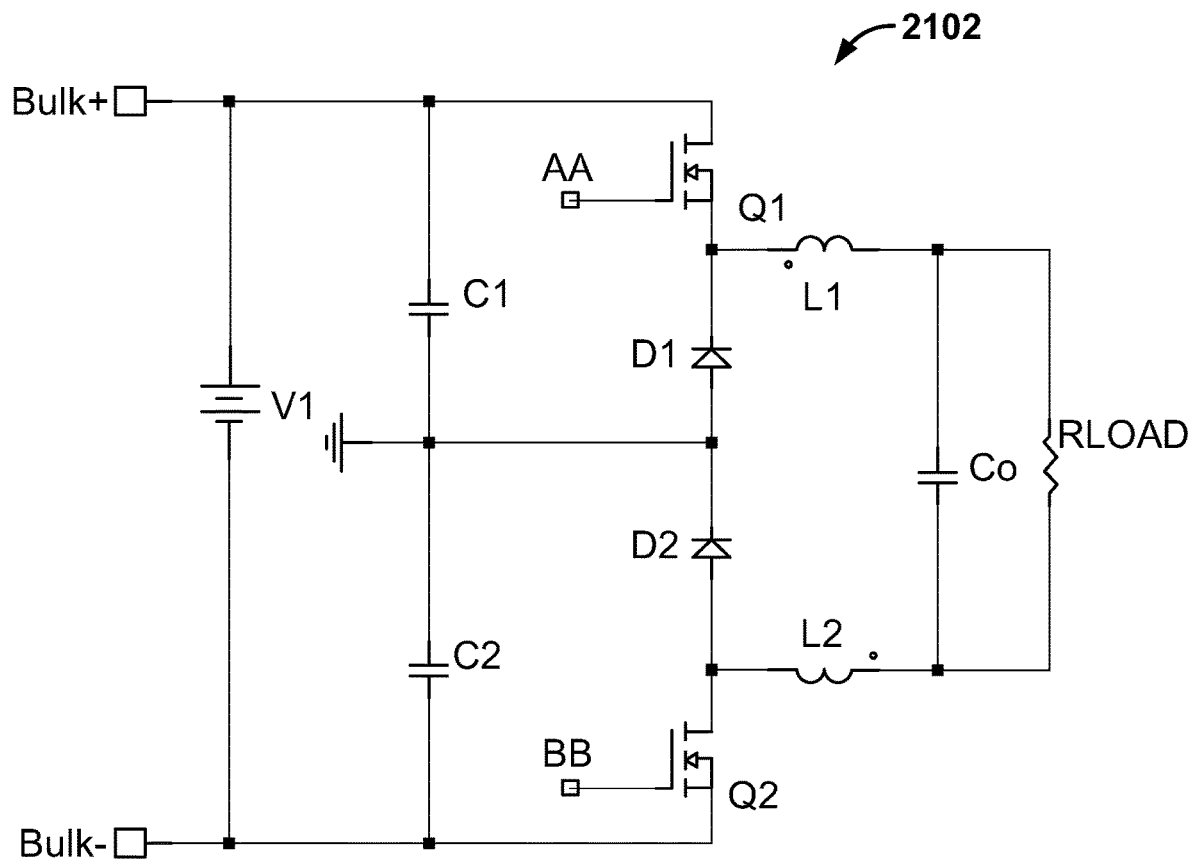
FIG. 21 is a circuit schematic of a multilevel buck power converter including diode rectifiers, according to another example embodiment.

In some embodiments, the rectifier switches disclosed herein may be replaced with other suitable switching devices such as diodes. For example, FIG. 21 illustrates a multilevel DC-DC buck power converter 2102 substantially similar to the multilevel DC-DC buck power converter 202 of FIG. 2, but including diodes D1, D2 instead of the synchronous rectifier switches Q3, Q4. In such examples, reverse current may not flow through the converter's buck circuits due to the diodes D1, D2.

The control circuits disclosed herein may include an analog control circuit, a digital control circuit, or a hybrid control circuit (e.g., a digital control unit and an analog circuit). The digital control circuits may be implemented with one or more types of digital control circuitry. For example, the digital control circuits each may include a digital controller such as a digital signal controller (DSC), a DSP, a microcontroller unit (MCU), a field-programmable gate array (FPGA), an application-specific IC (ASIC), etc. As such, any one of the control methods disclosed herein may be at least partially (and sometimes entirely) performed by a digital controller.

The multilevel DC-DC buck power converters disclosed herein may be controlled in any suitable method. For example, the multilevel DC-DC buck power converters may be controlled using voltage mode control methods, current mode control methods, etc.

Additionally, the multilevel DC-DC buck power converters may have a substantially linear duty cycle during operation. For example, the output voltage to input voltage relationship (e.g., the duty cycle) of the multilevel DC-DC buck power converters may remain substantially linear throughout different modes of operation such as an on-time overlapping mode, an on-time non-overlapping mode, a continuous conduction mode with or without fixed frequency, etc. In such examples, the duty cycle may range linearly between about 10% at an output voltage of roughly 50 VDC and 90% at an output voltage of roughly 700 VDC.

The teachings disclosed herein may be applicable in any suitable SMPS. For example, the power supplies disclosed herein may include an AC-DC PFC power converter that provides a high input voltage to one of the multilevel DC-DC buck power converters disclosed herein. The PFC power converter may be a three phase PFC power converter with a Vienna configuration. In some examples, the power supplies disclosed herein may be employed in systems requiring over current protection and/or hyper-scaling capabilities for providing appropriate outputs (e.g., trimmable outputs) as load demands change in the systems.

Various advantages may be achieved by employing any one of the power supplies disclosed herein. For example, the inductors (e.g., the inductors L1, L2 of the power converter 202) may be operable in an interleaved fashion. As a result, the size of the inductors may be reduced and the control bandwidth may be increased as compared to conventional power converters. Additionally, input capacitors (e.g., the capacitors C1, C2 of FIG. 2) in the multilevel DC-DC buck power converters may have balanced voltages due to dedicated charge/discharge times for the capacitors. Further, the power converters may operate with a wide output voltage range while maintaining voltage stresses at half the input voltage when the input capacitors are employed.

The power converters may also experience improved control performance due to CCM operation that is maintained down to a zero load. As such, light load control bandwidth may be increased as compared to conventional converters with discontinuous conduction mode (DCM) operation.

Additionally, the multilevel DC-DC buck power converters are operable over a wide duty cycle range such as between 10% and 90%. This may provide an increased hold-up for other power converter stages coupled to the buck power converters as compared to conventional systems. For example, the power supply may include a resonant power converter that is operable at a particular voltage (e.g., a 400 V input) to achieve high efficiency such as greater than 99%. If the multilevel DC-DC buck power converter receives a high input DC voltage (e.g., an 800 V bulk voltage), the typical duty cycle under nominal conditions is about 50% to ensure the buck power converter provides the desired voltage (e.g., the 400 V input) to the resonant power converter. If the load demand changes and/or the buck power converter's input changes, the duty cycle may be adjusted to provide the desired voltage to the resonant power converter. This ensures the power supply maintains a desired regulation.

Further, the resonant power converters disclosed herein may achieve ZVS and/or zero current switching (ZCS). For example, when the resonant power converters are operated with a fixed switching frequency, primary side switches may achieve ZVS, and secondary side switches may achieve ZVS and ZCS at all load conditions. Further, the gain curve of the resonant power converters may be flat so that operation of the converters is fixed at unity resonant gain. As a result, current sharing between rails is not sensitive to resonant component tolerances.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A switched mode power supply comprising:
    a power converter comprising:
        a first buck circuit comprising a power switch; and
        a second buck circuit comprising a power switch; and
    a control circuit coupled to the first buck circuit and the second buck circuit, the control circuit configured to generate a first control signal for the power switch of the first buck circuit and a second control signal for the power switch of the second buck circuit to control the power converter;
    wherein the control circuit is configured to adjust a switching frequency of the first control signal and the second control signal to control an amount of a reverse current flowing in the first buck circuit and the second buck circuit to achieve zero voltage switching of the power switch of the first buck circuit and the power switch of the second buck circuit while the power converter is in its continuous conduction mode; and
    wherein the first control signal and the second control signal have overlapping on times when a duty cycle of the first control signal and the second control signal exceeds a duty cycle threshold value, and non-overlapping on times when the duty cycle of the first control signal and the second control signal is below the duty cycle threshold value.

2. The switched mode power supply of claim 1, wherein the first buck circuit further comprises a rectifier and an inductor; and wherein the second buck circuit further comprises a rectifier and an inductor.

3. The switched mode power supply of claim 1, wherein the switched mode power supply further comprises a resonant power converter coupled to an output of the power converter.

4. The switched mode power supply of claim 3, wherein the resonant power converter includes an interleaved resonant power converter.

5. The switched mode power supply of claim 3, wherein the resonant power converter is operated at a fixed switching frequency.

6. The switched mode power supply of claim 1, wherein the duty cycle threshold value is fifty percent.

7. The switched mode power supply of claim 1, wherein the control circuit is configured to:

monitor the reverse current flowing in the first buck circuit and the second buck circuit; and adjust the switching frequency of the first control signal and the second control signal in steps based on a value of the reverse current.

8. The switched mode power supply of claim 1, wherein the control circuit is configured to decrease the switching frequency of the first control signal and the second control signal to increase the amount of the reverse current flowing in the first buck circuit and the second buck circuit.

9. The switched mode power supply of claim 1, wherein the control circuit is configured to adjust the switching frequency of the first control signal and the second control signal when a load current of the switched mode power supply is in a defined range.

10. The switched mode power supply of claim 9, wherein the defined range includes 10% to 40% of a full load peak current of the switched mode power supply.

11. The switched mode power supply of claim 9, wherein the first control signal and the second control signal have:

a first fixed switching frequency in response to the load current of the switched mode power supply being above the defined range; and a second fixed switching frequency in response to the load current of the switched mode power supply being below the defined range.

12. A method of controlling a switched mode power supply for powering a load, the method comprising:

generating, via a control circuit coupled to first and second buck circuits of a power converter, a first control signal for a power switch of the first buck circuit and a second control signal for a power switch of the second buck circuit to control the first and second buck circuits in a continuous conduction mode so that a reverse current flows in the first and second buck circuits; and adjusting a switching frequency of the first and second control signals to control an amount of the reverse current flowing in the first and second buck circuits to achieve zero voltage switching of the power switches of the first and second buck circuits while the power converter is in its continuous conduction mode; and wherein generating the first and second control signals comprises:

generating the first control signal and the second control signal to have overlapping on times in response to a duty cycle of the first control signal and the second control signal exceeding a duty cycle threshold value; and generating the first control signal and the second control signal to have non-overlapping on times in response to the duty cycle of the first control signal and the second control signal being below the duty cycle threshold value.

13. The method of claim 12, wherein the duty cycle threshold value is fifty percent.

14. The method of claim 12 further comprising:

monitoring the reverse current flowing in the first and second buck circuits; and adjusting the switching frequency of the first control signal and the second control signal in steps based on a value of the reverse current.

15. The method of claim 12 further comprising decreasing the switching frequency of the first control signal and the second control signal to increase the amount of the reverse current flowing in the first and second buck circuits.

16. The method of claim 12 further comprising adjusting the switching frequency of the first control signal and the second control signal in response to a load current of the switched mode power supply being within a defined range.

17. The method of claim 16, wherein the defined range includes 10% to 40% of a full load peak current of the switched mode power supply.

18. The method of claim 16, wherein generating the first and second control signals comprises:

generating the first and second control signals to have a first fixed switching frequency in response to the load current of the switched mode power supply being above the defined range; and generating the first and second control signals to have a second fixed switching frequency in response to the load current of the switched mode power supply being below the defined range.

19. A method of controlling a switched mode power supply for powering a load, the method comprising:

generating, via a control circuit coupled to first and second buck circuits of a power converter, a first control signal for a power switch of the first buck circuit and a second control signal for a power switch of the second buck circuit to control the first and second buck circuits in a continuous conduction mode so that a reverse current flows in the first and second buck circuits;

adjusting a switching frequency of the first and second control signals to control an amount of the reverse current flowing in the first and second buck circuits to achieve zero voltage switching of the power switches of the first and second buck circuits while the power converter is in its continuous conduction mode; and adjusting the switching frequency of the first control signal and the second control signal in response to a load current of the switched mode power supply being within a defined range;

wherein generating the first and second control signals comprises:

generating the first and second control signals to have a first fixed switching frequency in response to the load current of the switched mode power supply being above the defined range; and generating the first and second control signals to have a second fixed switching frequency in response to the load current of the switched mode power supply being below the defined range.

\* \* \* \* \*